United States Patent
Andersson et al.

(10) Patent No.: US 11,346,483 B2
(45) Date of Patent: May 31, 2022

(54) TANK TEE ASSEMBLY

(71) Applicant: Flomatic Corporation, Glens Falls, NY (US)

(72) Inventors: Allan Bo Andersson, Cambridge, NY (US); Ian Hargraves, Green Island, NY (US)

(73) Assignee: FLOMATIC CORPORATION, Glens Falls, NY (US)

( * ) Notice: Subject to any disclaimer, the term of this patent is extended or adjusted under 35 U.S.C. 154(b) by 155 days.

(21) Appl. No.: 16/865,853

(22) Filed: May 4, 2020

(65) Prior Publication Data
US 2020/0278066 A1    Sep. 3, 2020

Related U.S. Application Data

(63) Continuation-in-part of application No. 15/658,962, filed on Jul. 25, 2017, now abandoned.

(51) Int. Cl.
| | | |
|---|---|---|
| *F16K 27/06* | (2006.01) | |
| *F16K 27/02* | (2006.01) | |
| *F16L 41/02* | (2006.01) | |
| *F16L 55/07* | (2006.01) | |

(52) U.S. Cl.
CPC ............... *F16L 55/07* (2013.01); *F16K 27/02* (2013.01); *F16K 27/067* (2013.01); *F16L 41/021* (2013.01)

(58) Field of Classification Search
CPC ............. Y10T 137/87877; F16K 27/02; F16L 41/021; F16L 41/023
See application file for complete search history.

(56) References Cited

U.S. PATENT DOCUMENTS

| | | | | |
|---|---|---|---|---|
| 2,594,641 A | ‡ | 4/1952 | Griffith | F16K 15/063 137/543 |
| 4,397,445 A | * | 8/1983 | Burquier | F16L 37/47 251/149.9 |
| 4,535,808 A | * | 8/1985 | Johanson | F16K 15/063 137/533.21 |

(Continued)

OTHER PUBLICATIONS

Baker Water Systems, 8 Extracted pages of Campbell Manufacturing Catalog, Jun. 2014, downloaded from the internet Jul. 2019 from https://www.bakerwatersystems.com/uploads/files/pdf/campbell-product-catalog.pdf, pp. 2-7 (Year: 2014).‡

*Primary Examiner* — Seth W. Mackay-Smith
(74) *Attorney, Agent, or Firm* — Heslin Rothenberg Farley & Mesiti P.C.

(57) ABSTRACT

A tank tee assembly includes a tank tee body including a tank tee inlet, a tank tee outlet and a tank tee passageway therebetween. An annular flange is disposed on a peripheral surface of the tank tee passageway. At least one through-hole structure is disposed in the tank tee body downstream of the annular flange. A poppet valve assembly is disposed in the tank tee passageway between the annular flange and the at least one through-hole structure. The poppet valve assembly includes a poppet and a guide. The guide is rigidly secured within the tank tee passageway. The guide includes a guide base. The guide base has an outside diameter that is larger than an inside diameter of the annular flange. The tank tee passageway is free of any threaded connections between the annular groove and the at least one through-hole structure.

19 Claims, 24 Drawing Sheets

(56) References Cited

U.S. PATENT DOCUMENTS

| | | | | |
|---|---|---|---|---|
| 4,726,399 A * | 2/1988 | Miller | F16L 41/021 | 137/597 |
| 4,937,445 A | 6/1990 | Leong et al. | | |
| 4,979,721 A ‡ | 12/1990 | Gilbert | F16K 27/0209 | 137/515.5 |
| 5,176,171 A ‡ | 1/1993 | Andersson | F16K 15/063 | 137/51 |
| 5,230,366 A * | 7/1993 | Marandi | G05D 7/01 | 137/613 |
| 5,533,549 A ‡ | 7/1996 | Sherman | F16K 27/067 | 137/55 |
| 6,019,349 A ‡ | 2/2000 | Horne | F16K 5/0631 | 251/14 |
| 6,024,121 A ‡ | 2/2000 | Anderson | F16K 15/063 | 137/51 |
| 6,058,975 A ‡ | 5/2000 | Hui-Chen | F16K 11/20 | 137/271 |
| 6,581,633 B2 ‡ | 6/2003 | Andersson | F16K 15/026 | 137/53 |
| 6,814,101 B2 * | 11/2004 | Flauzac | F16K 5/0605 | 137/517 |
| 6,866,062 B2 ‡ | 3/2005 | Lammers | F16K 15/063 | 137/513.7 |
| 7,128,088 B2 ‡ | 10/2006 | Andersson | F16K 15/063 | 137/51 |
| 7,216,672 B1 ‡ | 5/2007 | Chen | F16K 11/20 | 137/883 |
| 7,631,662 B2 ‡ | 12/2009 | Reck | F16K 5/0605 | 137/625.47 |
| 8,109,295 B2 ‡ | 2/2012 | Osteen | F16K 1/308 | 137/881 |
| 8,316,886 B2 ‡ | 11/2012 | Olsen | F16K 11/22 | 137/597 |
| 8,978,696 B2 ‡ | 3/2015 | Andersson | F16K 15/06 | 137/53 |
| 9,032,992 B2 ‡ | 5/2015 | Andersson | F16K 25/005 | 137/51 |
| 9,061,223 B2 * | 6/2015 | Winborn | B01D 35/28 | |
| 9,163,737 B2 ‡ | 10/2015 | Andersson | F16K 15/06 | |
| 9,371,947 B2 * | 6/2016 | Choi | F24D 3/1075 | |
| 9,546,897 B1 * | 1/2017 | Miller | G01F 25/0007 | |
| 9,611,948 B1 ‡ | 4/2017 | Andersson | F16K 15/18 | |
| 2003/0102039 A1 ‡ | 6/2003 | Marzorati | F16K 27/003 | 137/883 |
| 2005/0269544 A1 * | 12/2005 | Oh | F16K 39/06 | 251/315.01 |
| 2008/0314466 A1 ‡ | 12/2008 | Cimberio | F16K 11/20 | 137/883 |
| 2010/0018911 A1 ‡ | 1/2010 | VanZeeland | E03B 1/04 | 210/86 |
| 2010/0059128 A1 ‡ | 3/2010 | Reck | F16K 5/0605 | 137/597 |
| 2011/0062366 A1 ‡ | 3/2011 | Thomas | F16K 5/0642 | 251/315.01 |
| 2013/0284278 A1 * | 10/2013 | Winborn | F16L 15/00 | 137/15.01 |
| 2014/0261848 A1 * | 9/2014 | Roden | F16K 27/067 | 138/177 |
| 2014/0299809 A1 ‡ | 10/2014 | Morris | F16K 27/00 | 251/366 |
| 2016/0265671 A1 * | 9/2016 | Nomaguchi | F16K 27/067 | |
| 2018/0259076 A1 ‡ | 9/2018 | Feng | F16K 11/0876 | |

\* cited by examiner

‡ imported from a related application

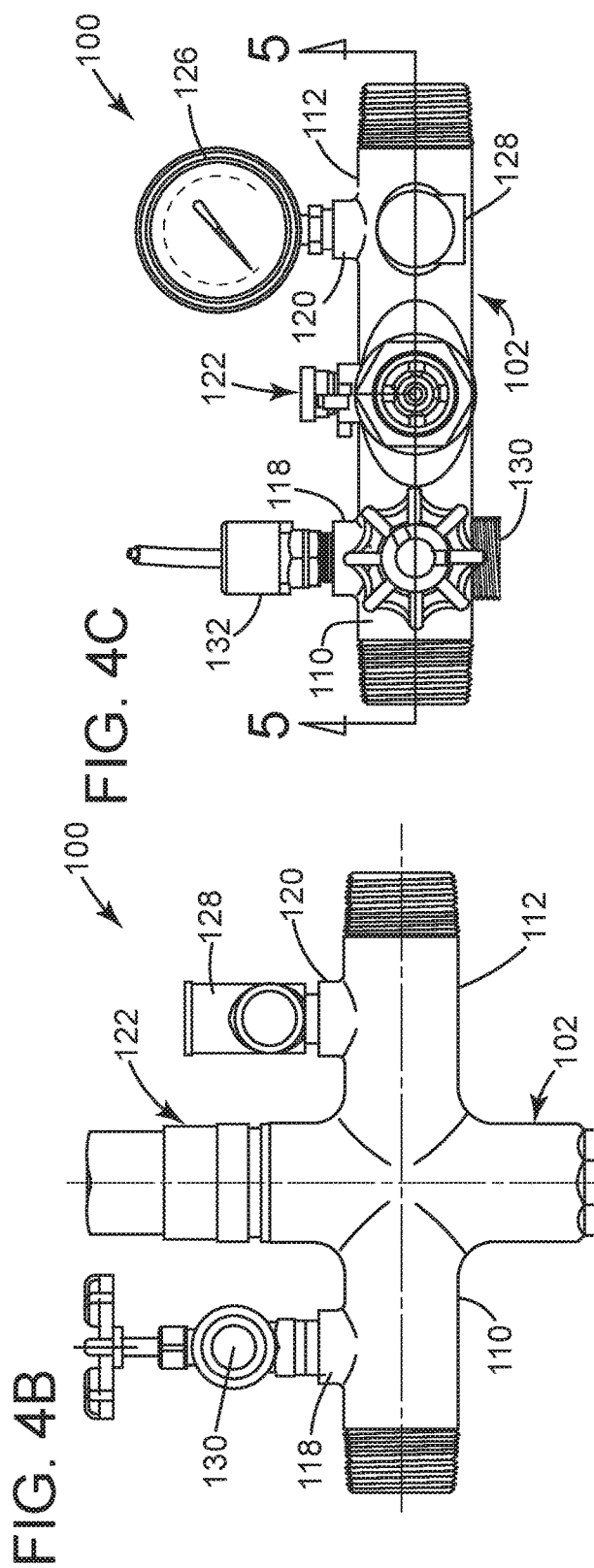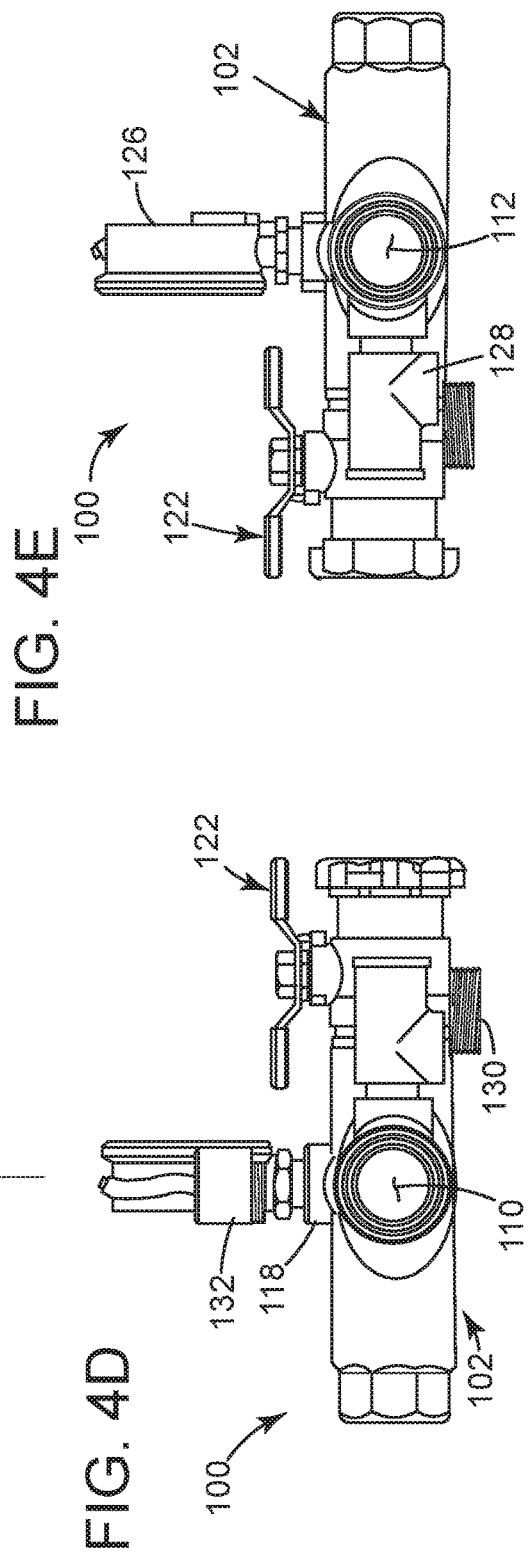

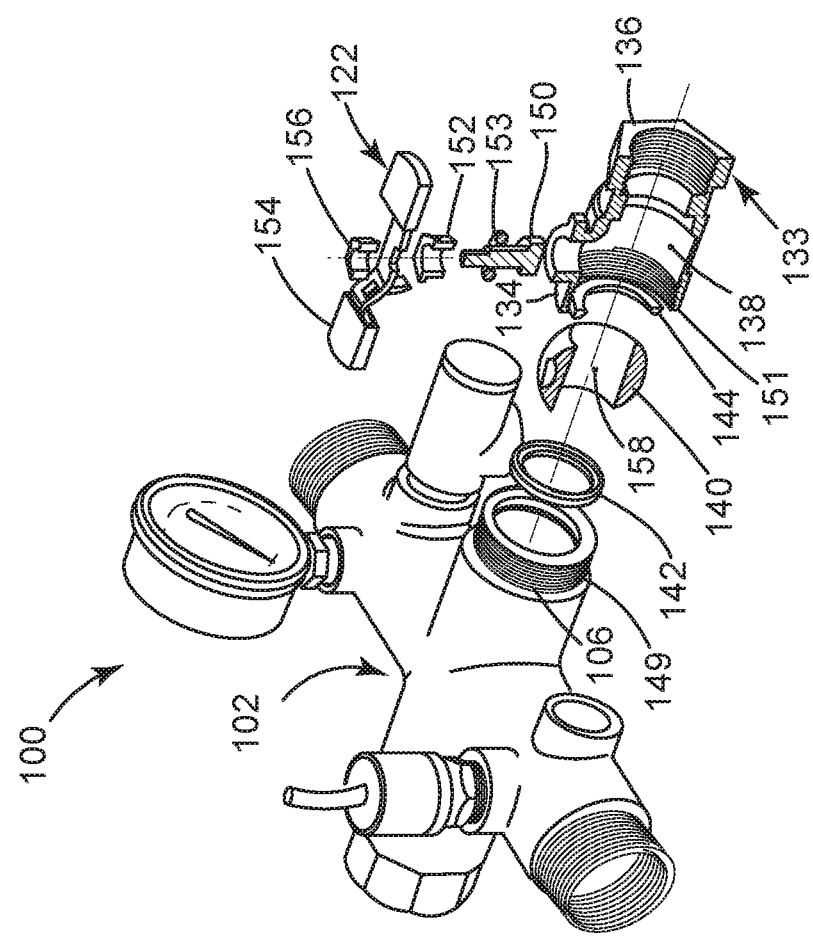
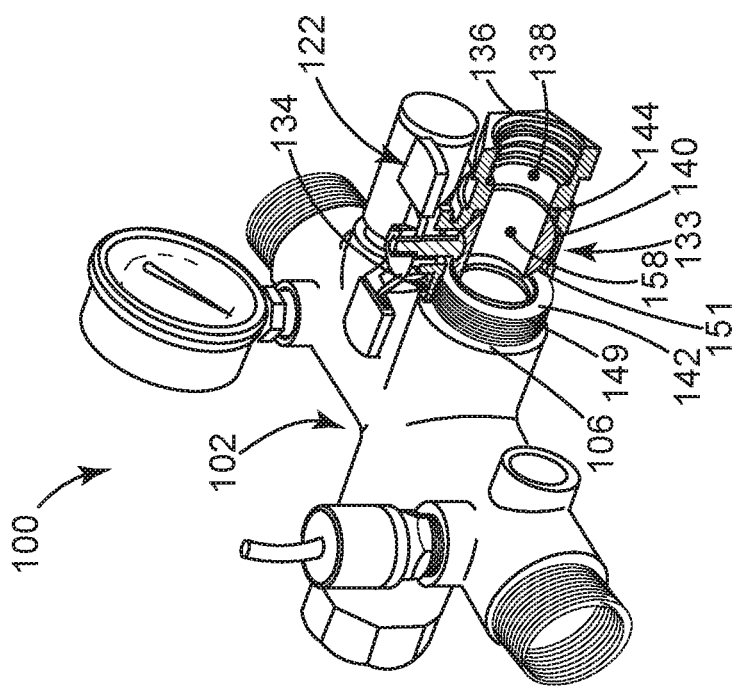

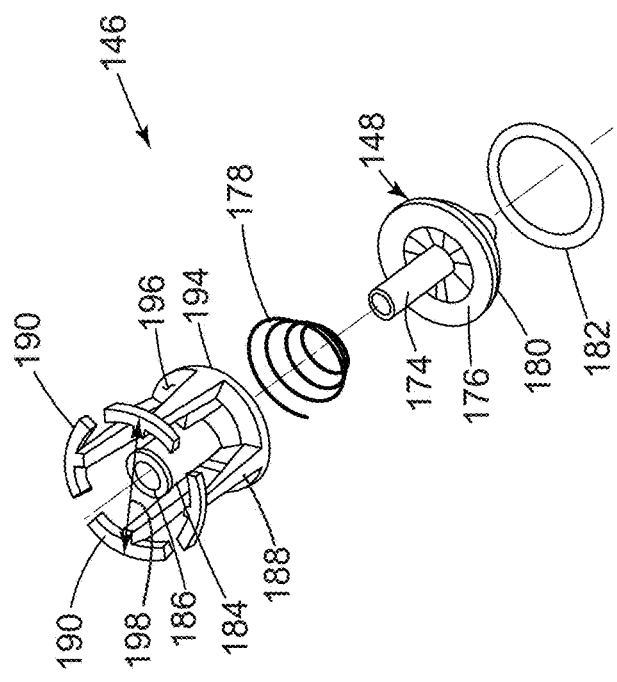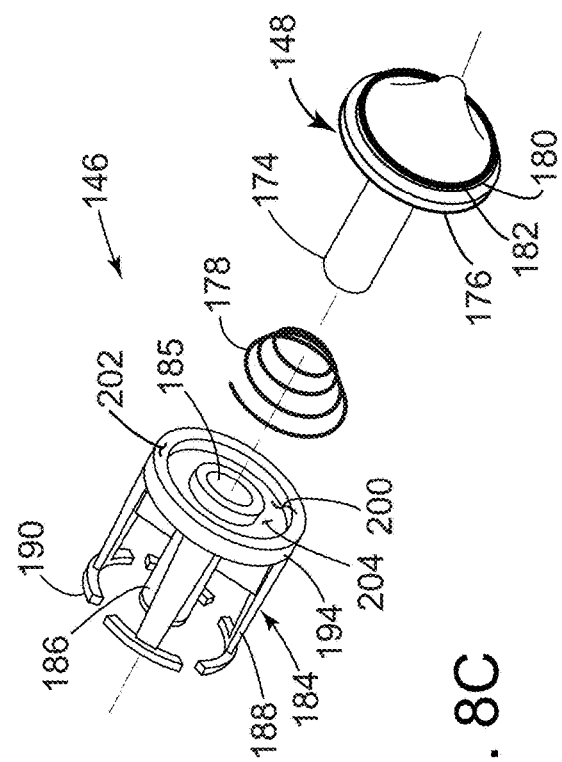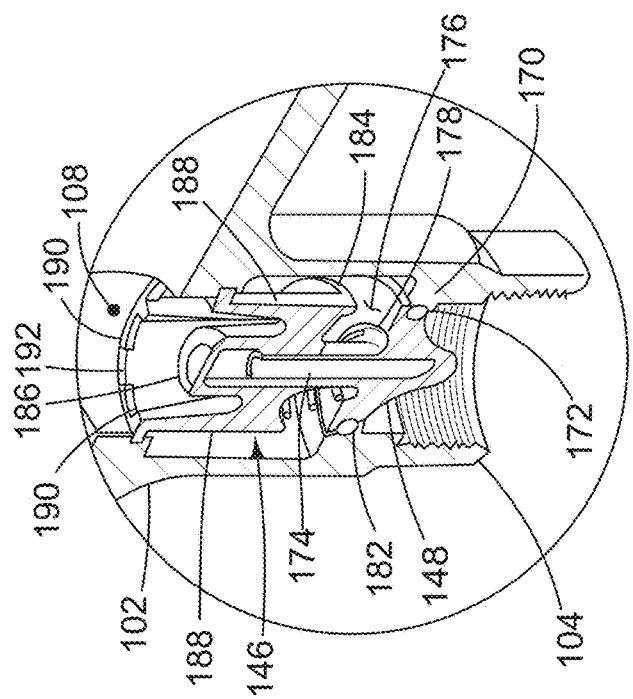

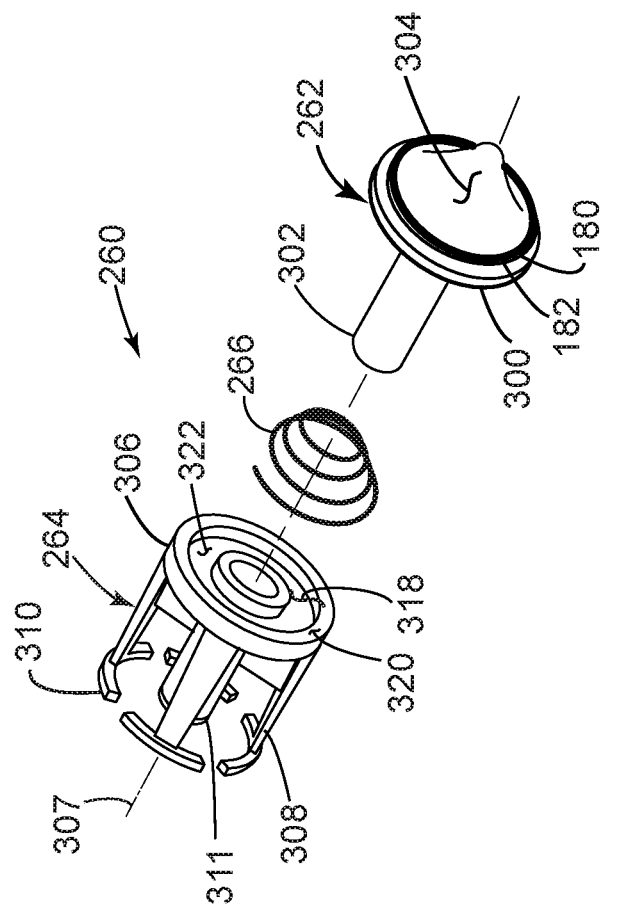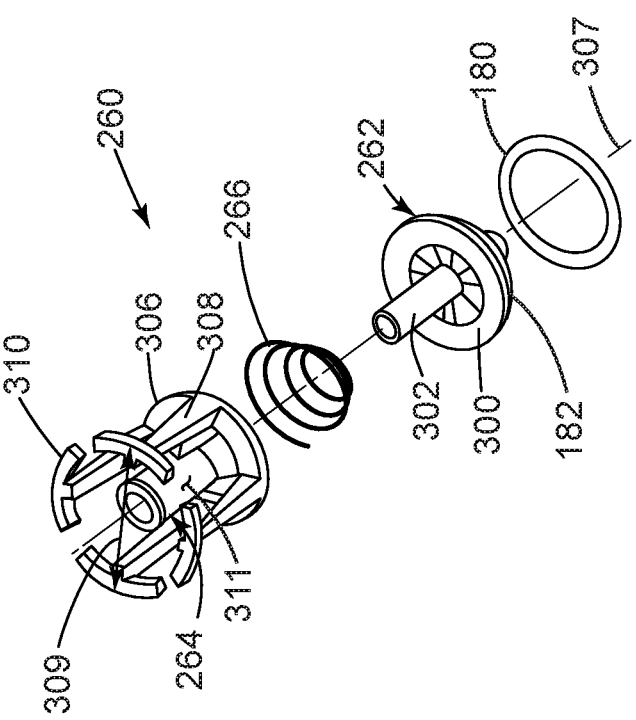

FIG. 24

330 — Providing a tank tee assembly 210 having a tank tee body 212. The tank tee body 212 includes a tank tee inlet 214, a tank tee outlet 216 and a tank tee passageway 218 therebetween. An inner annular shoulder 312 is disposed on a peripheral surface of the tank tee passageway 218 proximate the tank tee outlet 216. An annular flange 220 is disposed on the peripheral surface of the tank tee passageway 218 proximate the tank tee inlet 214. An annular groove 222 is disposed in the peripheral surface of the tank tee passageway 218 downstream of the annular flange 220. At least one through-hole 224, 226, 228, 230, 236, 238 is disposed in the tank tee body 212 downstream of the annular groove 222

332 — Providing components of a poppet valve assembly 260. The components include a poppet 262 and a guide 264. The poppet 262 has a disk 300 and a stem 302 extending from the disk 300. The guide 264 has a rigid guide base 306, support arms 308 extending upwards from the guide base 306 and arcuate tabs 310 disposed on distal ends of the support arms 308.

334 — Mounting the tank tee inlet 214 onto a base tool 270, such that a central protrusion 280 of the base tool 270 extends past the annular flange 220.

336 — Inserting the poppet 262 through the tank tee outlet 216, such that a bottom surface 304 of the disk 300 of the poppet 262 is abutted against a top surface 282 of the protrusion 280.

338 — Inserting a sleeve tool 272 through the tank tee outlet 216. The sleeve tool 272 has an upper rim 288 configured to mount against the inner annular shoulder 312. When the sleeve tool 272 is mounted against the inner annular shoulder 312, the sleeve tool 272 extends past the at least one through-hole 224, 226, 228, 230, 236, 238 and a distal end 286 of the sleeve tool 272 is positioned proximate the annular groove 222.

340 — Inserting the guide 264, utilizing a probe tool 274, through the sleeve tool 272 until the guide base 306 of the guide 264 is supported by the poppet 262 and protrusion 280. The poppet 262 and protrusion 280 positioning the guide 264 so that the tabs 310 of the guide 264 fit into the annular groove 222 to rigidly secure the guide 264 within the tank tee passageway 218.

FIG. 25

A spring 266 is inserted through the tank tee outlet 216 after inserting the poppet 262 and prior to inserting the sleeve tool 272. The spring 266, in this embodiment, is a conical spring having concentric conical coils. ⟶ 342

The guide base 306 of the guide 264 includes an upstream side 318 having an outer circumferential portion 320 and an inner cavity portion 322. The inner cavity portion 322 is sized to receive the largest coil of the conical spring 266 ⟶ 344

The guide 264 is inserted, via the probe 274, through the sleeve tool 272 until the circumferential portion 320 of the guide 264 abuts flush against the disk 300 of the poppet 262 and the conical spring 266 is fully compressed into the cavity portion 322 of the guide 264. ⟶ 346

TANK TEE ASSEMBLY

CROSS REFERENCE TO RELATED APPLICATIONS

This application is a continuation in part of, and claims priority to, U.S. patent application Ser. No. 15/658,962, filed on Jul. 25, 2017. The content of the prior application is hereby incorporated by reference herein in its entirety.

TECHNICAL FIELD

The present invention relates to tank tee assemblies for water distribution systems. More specifically, the invention relates to tank tee assemblies for well pump installations.

BACKGROUND

Tank tee assemblies are used in water distribution systems. Typically, a tank tee assembly is used in a well pump installation, where the tank tee assembly connects a pressurized water tank to the main water passageway from the well pump to the application. That application may be a domestic or industrial building plumbing system, a farm irrigation system, a booster pump system or the like.

Prior art (i.e., conventional) tank tee assemblies include a main passageway for the main well water flow and a single tank leg for the pressurized tank water. The single tank leg is usually teed into the main passageway. Various accessories (i.e., components) are connected to the conventional tank tee assembly to monitor and/or control the functional requirements of the application. For example, in almost all well pump installations, the conventional tank tee assembly is connected to a separate isolation ball valve in order to be able to isolate the application from the well pump when needed. Additionally, in almost all well pump installations, a separate check valve is connected to the tank tee assembly in order to prevent backflow into the well from the pressurized tank. Other accessories may include pressure gages, pressure transducers and/or pressure switches, drain valves, relief valves and the like.

However, a plurality of connecting components, such as fittings, tubing and/or pipes, are required to connect the accessories to the conventional tank tee assembly. These additional connecting components take up space, require time and labor to assemble, and add cost to the entire installation project. In addition, the greater the number of threaded fittings and connections, the greater the risk of leakage. Further, the more connections utilized between the accessories and the conventional tank tee assembly, the greater the pressure drop of water flow through the installation will be and the lower the flow efficiency will be.

Accordingly, there is a need for a tank tee assembly that reduces space, eliminates connecting components, reduces manufacturing costs and increases flow efficiency relative to prior art tank tee assemblies. Additionally, there is a need for a tank tee assembly that eliminates the need for a separate isolation ball valve and/or separate check valve in a well pump installation system. Also there is a need for a tank tee assembly having a more compact and efficient design relative to prior art tank tee assemblies in order to reduce installation time into water distribution systems such as a well pump assembly.

BRIEF DESCRIPTION

The present invention offers advantages and alternatives over the prior art by providing a tank tee assembly that includes a tank tee body attached to a ball valve assembly and/or an integrated poppet valve assembly. The tank tee body is utilized as a tailpiece for the ball valve assembly. The tank tee body is also utilized as a valve body for the poppet valve assembly. The tank tee body further includes plurality of through-hole structures for accessories. The tank tee assembly of the present invention reduces space, eliminates connecting components, reduces manufacturing costs, reduces installation time and increases flow efficiency relative to prior art tank tee assemblies.

A tank tee assembly in accordance with one or more aspects of the present invention includes a tank tee body. The tank tee body includes a tank tee inlet, a tank tee outlet and a tank tee passageway therebetween. An annular flange is disposed on a peripheral surface of the tank tee passageway. At least one through-hole structure is disposed in the tank tee body downstream of the annular flange. A poppet valve assembly is disposed in the tank tee passageway between the annular flange and the at least one through-hole structure. The poppet valve assembly includes a poppet and a guide. The guide is rigidly secured within the tank tee passageway. The guide includes a guide base. The guide base has an outside diameter that is larger than an inside diameter of the annular flange. The tank tee passageway is free of any threaded connections between the annular groove and the at least one through-hole structure.

A method of assembling a poppet valve assembly into a tank tee assembly in accordance with one or more aspects of the present invention includes providing a tank tee assembly. The tank tee assembly includes a tank tee body including a tank tee inlet, a tank tee outlet and a tank tee passageway therebetween. An inner annular shoulder is disposed on a peripheral surface of the tank tee passageway proximate the tank tee outlet. An annular flange is disposed on the peripheral surface of the tank tee passageway proximate the tank tee inlet. An annular groove is disposed in the peripheral surface of the tank tee passageway downstream of the annular flange. At least one through-hole structure is disposed in the tank tee body downstream of the annular groove. The method also includes providing components of a poppet valve assembly. The components include a poppet and a guide. The poppet has a disk and a stem extending from the disk. The guide has a guide base. Support arms extend upwards from the guide base and arcuate tabs are disposed on distal ends of the support arms. The method further includes mounting the tank tee inlet onto a base tool, such that a central protrusion of the base tool extends past the annular flange. The poppet is inserted through the tank tee outlet, such that a bottom surface of the disk of the poppet is abutted against a top surface of the protrusion. A sleeve tool is inserted through the tank tee outlet. The sleeve tool has an upper rim configured to mount against one of the inner annular shoulder and a distal end of the tank tee outlet. When the sleeve tool is mounted against the one of the inner annular shoulder and the distal end of the tank tee outlet, the sleeve tool extends past the at least one through-hole structure and a distal end of the sleeve tool is positioned proximate the annular groove. The guide, utilizing a probe tool, is inserted through the sleeve tool until the guide base of the guide is supported by the poppet and protrusion. The poppet and protrusion position the guide so that the tabs of the guide fit into the annular groove to rigidly secure the guide within the tank tee passageway.

DRAWINGS

The invention will be more fully understood from the following detailed description taken in conjunction with the accompanying drawings, in which:

FIG. 4B depicts a bottom view of the exemplary embodiment of the tank tee assembly of FIG. 4A, in accordance with the present invention;

FIG. 4C depicts a front view of the exemplary embodiment of the tank tee assembly of FIG. 4A, in accordance with the present invention;

FIG. 4D depicts another side view of the exemplary embodiment of the tank tee assembly of FIG. 4A, in accordance with the present invention;

FIG. 4E depicts another side view of the exemplary embodiment of the tank tee assembly of FIG. 4A, in accordance with the present invention;

FIG. 6A depicts a perspective view of an exemplary embodiment of the tank tee assembly of FIG. 5 having a cut away view of a ball valve assembly shown in circle 6A of FIG. 5, in accordance with the present invention;

FIG. 6B depicts an exploded view of the exemplary embodiment of the ball valve assembly of FIG. 6A, in accordance with the present invention;

FIG. 8A depicts a perspective view of an exemplary embodiment of a poppet valve assembly shown within circle 8A of FIG. 5, in accordance with the present invention;

FIG. 8B depicts an exploded top perspective view of the exemplary embodiment of the poppet valve assembly of FIG. 8A, in accordance with the present invention;

FIG. 8C depicts an exploded bottom perspective view of the exemplary embodiment of the poppet valve assembly of FIG. 8A, in accordance with the present invention;

FIG. 12A depicts an exploded top perspective view of the poppet valve assembly of FIG. 11, in accordance with the present invention;

FIG. 12B depicts an exploded bottom perspective view of the poppet valve assembly of FIG. 11, in accordance with the present invention;

FIG. 24 depicts a flow diagram of an exemplary embodiment of the method of assembling a poppet valve assembly into a tank tee assembly, in accordance with the present invention; and FIG. 25 depicts a flow diagram of an exemplary embodiment of the method of assembling a poppet valve assembly into a tank tee assembly, in accordance with the present invention, wherein the flow diagram of FIG. 25 supports the flow diagram of FIG. 24.

DETAILED DESCRIPTION

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Figure 1:
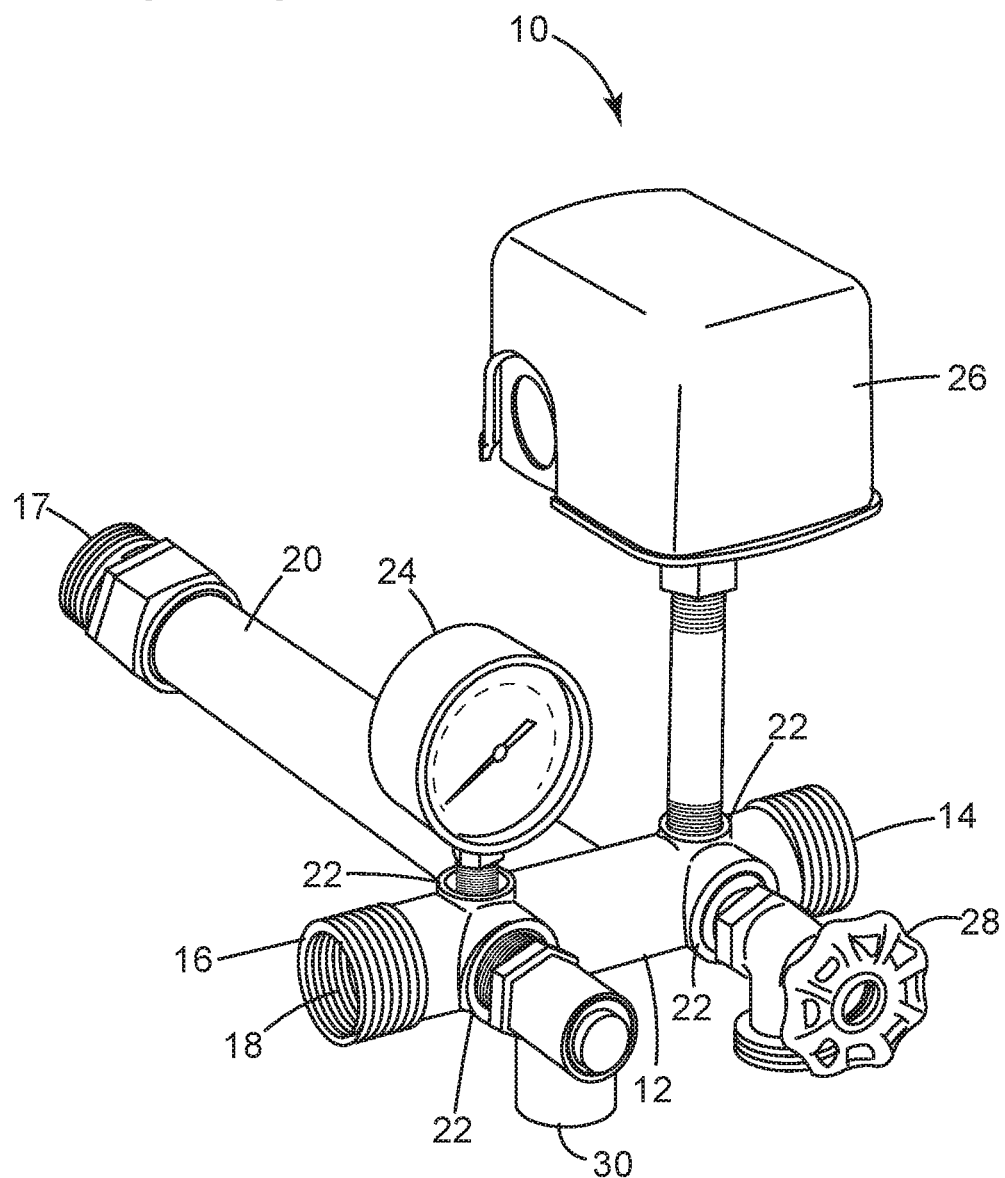
FIG. 1 depicts a perspective view of an exemplary embodiment of a prior art tank tee assembly, in accordance with the present invention.

Referring to FIG. 1, an exemplary embodiment of a prior art tank tee assembly 10 is presented. The tank tee assembly 10 includes a tank tee body 12. The tank tee body includes a threaded tank tee inlet 14, a threaded tank tee outlet 16 and a tank tee passageway 18 therebetween.

The tank tee inlet 14 is disposed at the upstream end of the passageway 18 and receives water from a well pump installation (not shown). The tank tee outlet 16 is disposed at the downstream end of the passageway 18, wherein the main flow of water exits the passageway 18 and flows toward a water distribution system (not shown).

Herein, the term "downstream", when used as a directional term, shall mean in the direction of flow of the main flow of water through the tank tee passageway 108, which is from the tank tee inlet 104 to the tank tee outlet 106. Also "downstream", when used to describe a first feature relative to a second feature (for example, the "downstream" side of a flange having both downstream and upstream sides, or a groove disposed "downstream" of a through-hole structure in the tank tee passageway) shall mean that the first feature is positioned in the tank tee passageway 108 closer to the tank tee outlet 106 than the second feature is.

Also, herein, the term "upstream", when used as a directional term, shall mean in the opposing direction of the main flow of water through the tank tee passageway 108, which is from the tank tee outlet 106 to the tank tee inlet 104. Also "upstream", when used to describe a first feature relative to a second feature (for example, the "upstream" side of a flange having both downstream and upstream sides, or a groove disposed "upstream" of a through-hole structure in the tank tee passageway) shall mean that the first feature is positioned in the tank tee passageway 108 closer to the tank tee inlet 104 than the second feature is.

The assembly 10 also includes a tank leg 20 having a threaded tank leg outlet 17 that is disposed in fluid communication with the tank tee passageway 18 intermediate the tank tee inlet 14 and tank tee outlet 16. The tank leg outlet 17 is connected to plumbing that is in fluid communication with a pressurized water tank (not shown). The tank is typically an air pressurized diaphragm tank that helps to maintain a predetermined pressure (typically about 30 to 60 psi) on the water distribution system. The water tank provides water to the system between pump starts and stops, typically controlled by an electric pressure switch 26.

In this prior art embodiment, the tank tee inlet 14, the tank tee outlet 16 and the tank leg outlet 17 are all interchangeable. For example, the tank leg outlet 17 may be used as the tank tee inlet 14 or the tank tee inlet 16. That is because the prior art tank tee body 12 is a basic tee with no restrictions on flow direction. Therefore, the designation of which threaded inlet or outlet 14, 16, 17 will function as the tank tee inlet, tank tee outlet or tank leg outlet is a matter of choice.

Various threaded taps 22, are disposed in the tank tee body 12. The taps are sized to receive various accessories such as a pressure gage 24, a pressure switch 26, a boiler drain 28 and a relief valve 30.

Figure 2:
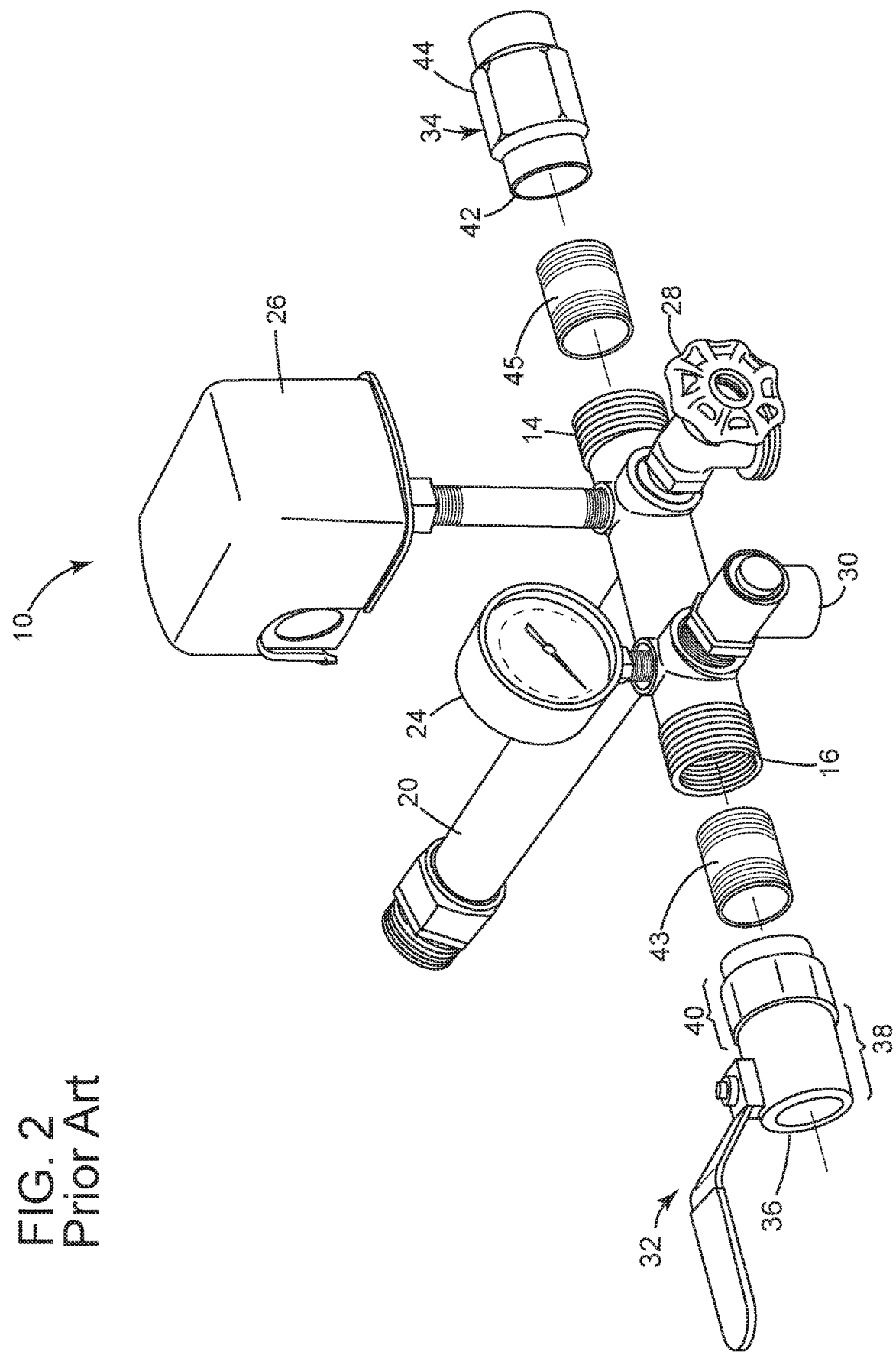
FIG. 2 depicts a perspective view of an exemplary embodiment of a prior art isolation ball valve and a prior art check valve schematically connected to the prior art tank tee assembly of FIG. 1, in accordance with the present invention.

Referring to FIG. 2, a conventional isolation ball valve 32 and conventional check valve 34 that are usually connected to the prior art tank tee assembly 10 are shown. In almost all well pump installations, the outlet 16 of the tank tee assembly 10 is connected by various additional fittings and pipes (not shown) to a ball valve inlet 36 of a conventional ball valve 32.

The conventional ball valve 32 includes a main ball valve body 38 that is in threaded engagement with a ball valve tailpiece 40. A ball element is captured within a ball valve passageway of the ball valve body 38 by a pair of ball valve seats that are disposed on opposing upstream and downstream sides of the ball element. The threaded engagement of the tailpiece 40 to the ball valve body 38 is such that the tailpiece urges the ball valve seats into sealing engagement against the ball element. The tailpiece 40 is typically connected to the outlet 16 of the tank tee assembly 10 by various fittings (such as, for example, nipple 43).

Additionally, in almost all well pump installations, the outlet 42 of a check valve 34 is connected by various other fittings and pipes (such as, for example nipple 45) to the inlet 14 of the tank tee assembly 10. The conventional check valve 34 includes a check valve body 44 that provides support for a poppet valve assembly.

Problematically however, the fittings and pipes that are used to connect the conventional check valve 34, ball valve 32 and tank tee assembly 10 together can add a significant amount of space to the well pump installation. Further, the cost of the installation is increased with each new fitting and/or pipe that has to be added, while the flow efficiency is decreased. In addition, leakage risks increase with the number of pipe connections. This is especially true with stainless steel pipe fittings and valves as the traditional "make up tightening" cannot be done to stop leakage with stainless material as it will risk galling of the threads. One the fittings has seized up from galling it is typically impossible to remove without cutting the pipe fittings and valve.

Figure 3:
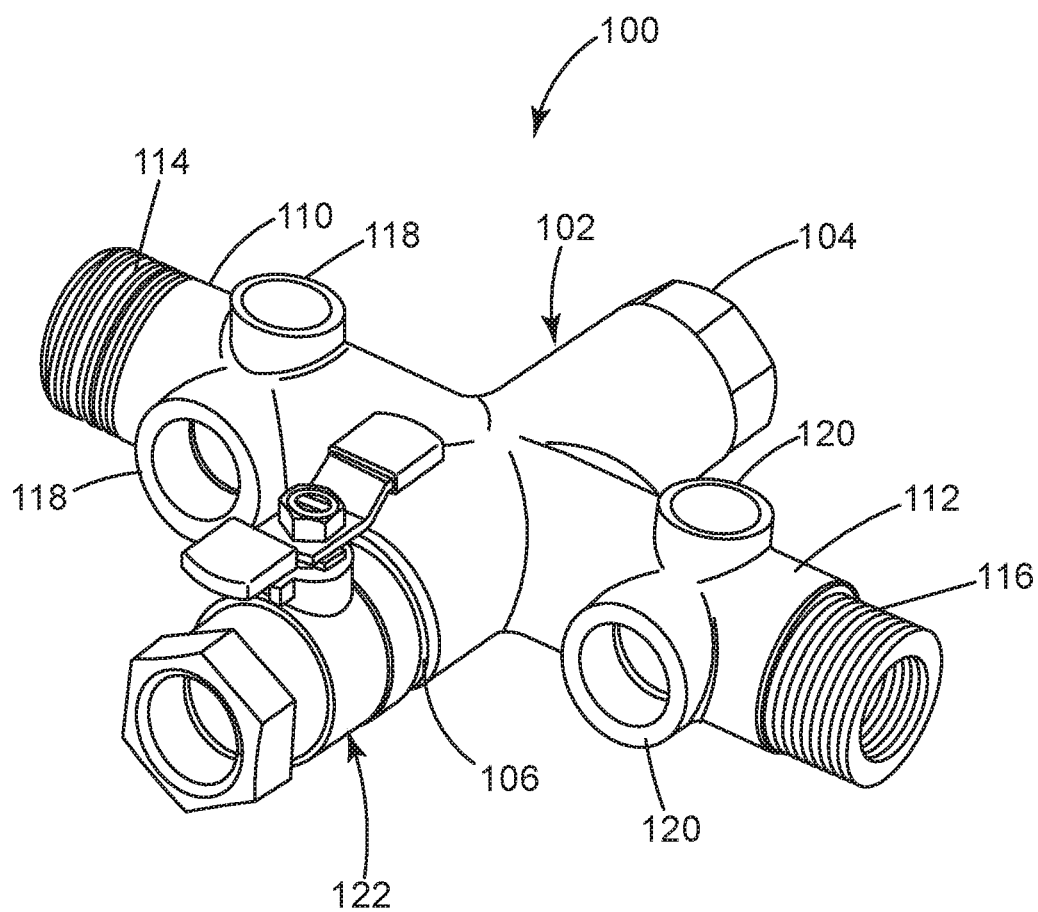
FIG. 3 depicts a perspective view of an exemplary embodiment of a tank tee assembly, in accordance with the present invention.

Referring to FIG. 3, an exemplary embodiment of a tank tee assembly 100 in accordance with the present invention is presented. The tank tee assembly 100 includes a tank tee body 102. The tank tee body 102 includes a tank tee inlet 104, a tank tee outlet 106 and a tank tee passageway 108 (best seen in FIG. 5) therebetween. More specifically, the tank tee inlet 104 is disposed on the downstream end of the tank tee passageway 108 where a flow of water (from a well pump for example) enters the passageway 108. The tank tee outlet 106 is disposed on the upstream end of the passageway 108 where the water flow exits the passageway 108 and enters a ball valve assembly 122.

In water distribution system, the back pressure may be up to 50 pounds per square inch (psi) or greater. Additionally, water has a corrosive effect on many materials. Therefore, in order to operate at such pressures, and be able to resist the corrosive effects of water, the tank tee body 108 may be composed of stainless steel or brass. Further, the metal of the tank tee body 108 may be formed from a mold during a casting process. For example, the tank tee body 108 may be a cast stainless steel or a cast brass, wherein the tank tee passageway is free of any welded connections and/or seams.

Figure 5:
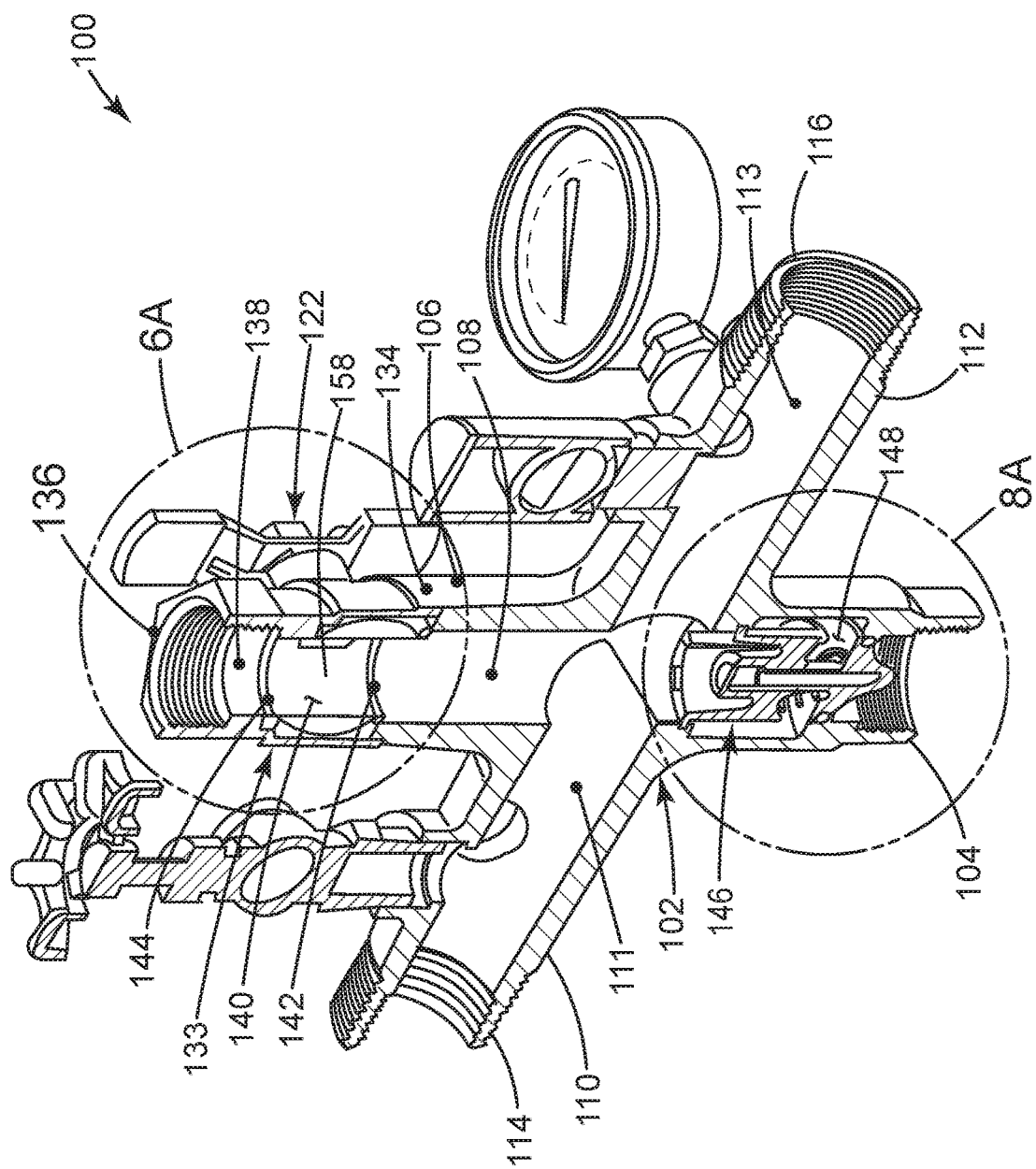
FIG. 5 depicts a cross sectional view of an exemplary embodiment of the tank tee assembly of FIG. 4C taken along the line 5-5 of FIG. 4C, in accordance with the present invention.

The tank tee body 102 also includes a first tank leg 110 having a first tank leg passageway 111 (best seen in FIG. 5) and an optional second leg 112 having a second tank leg passageway 113 (best seen in FIG. 5). Both the first and second tank leg passageways 111, 113 are disposed in fluid communication with the tank tee passageway 108 intermediate the tank tee inlet 104 and tank tee outlet 106.

Note that this embodiment shows a tank tee assembly 100 having a first and a second tank legs 110, 112. However, other embodiments of the tank tee assembly 100 may include only a single tank leg.

The first and second tank legs 110, 112 include threaded end portions 114, 116 respectively. The first end portion 114 is designed to connect to a pressurized water tank (not shown), which is generally used in a well pump installation. The second end portion 116 may be optionally connected to a second pressurized water tank or other similar component. Alternatively, the second end portion 116 may be plugged.

A first pair of threaded taps 118 is disposed in the first tank leg 110. A second pair of threaded taps 120 is disposed in the second tank leg 112. As will be discussed in greater detail herein, the first and second pair of threaded taps 118, 120 are sized to receive a plurality of tank tee accessories, depending on the requirements of the application.

For purposes herein, the tank legs 110, 112 and the threaded taps 118, 120 are considered to be embodiments of various through-hole structures. Even though only tank legs 110, 112 are illustrated in FIG. 3 as being disposed in the tank tee body 102, other types of through-hole structures may also be disposed in the tank tee body 102 and extend into the tank tee passageway 108. For example, taps 118 and 120 may also be disposed in the tank tee body 102 rather than in the first and second tank legs 110, 112. Moreover, a through-hole structure may include any type of structure disposed on the tank-tee body 102, wherein the structure includes a hole that extends into the tank tee passageway 108.

The ball valve assembly 122 is in threaded engagement with the tank tee outlet 106 of the tank tee body 102 such that, when the flow of water exits the tank tee outlet 106, it then passes through a valve passageway 138 (best seen in FIGS. 5, 6A and 6B). As will be discussed in greater detail herein, the ball valve assembly 122 does not include a conventional ball valve tailpiece. Rather the tank tee body 102 functions as the tailpiece of the ball valve assembly 122.

Advantageously, by utilizing the tank tee body 102 as the tailpiece for the ball valve assembly 122, any fittings, pipes and/or other plumbing components that would be used to connect a conventional ball valve to a conventional tank tee assembly are eliminated. Additionally, the tailpiece of such a conventional ball valve is also eliminated. This also eliminates potential leak paths between the system components which are difficult to correct for an install due to the many connections to the tank tee. Additionally, it eliminates the problem of galling of the threads, which was discussed with reference to FIG. 2.

Figure 4A:
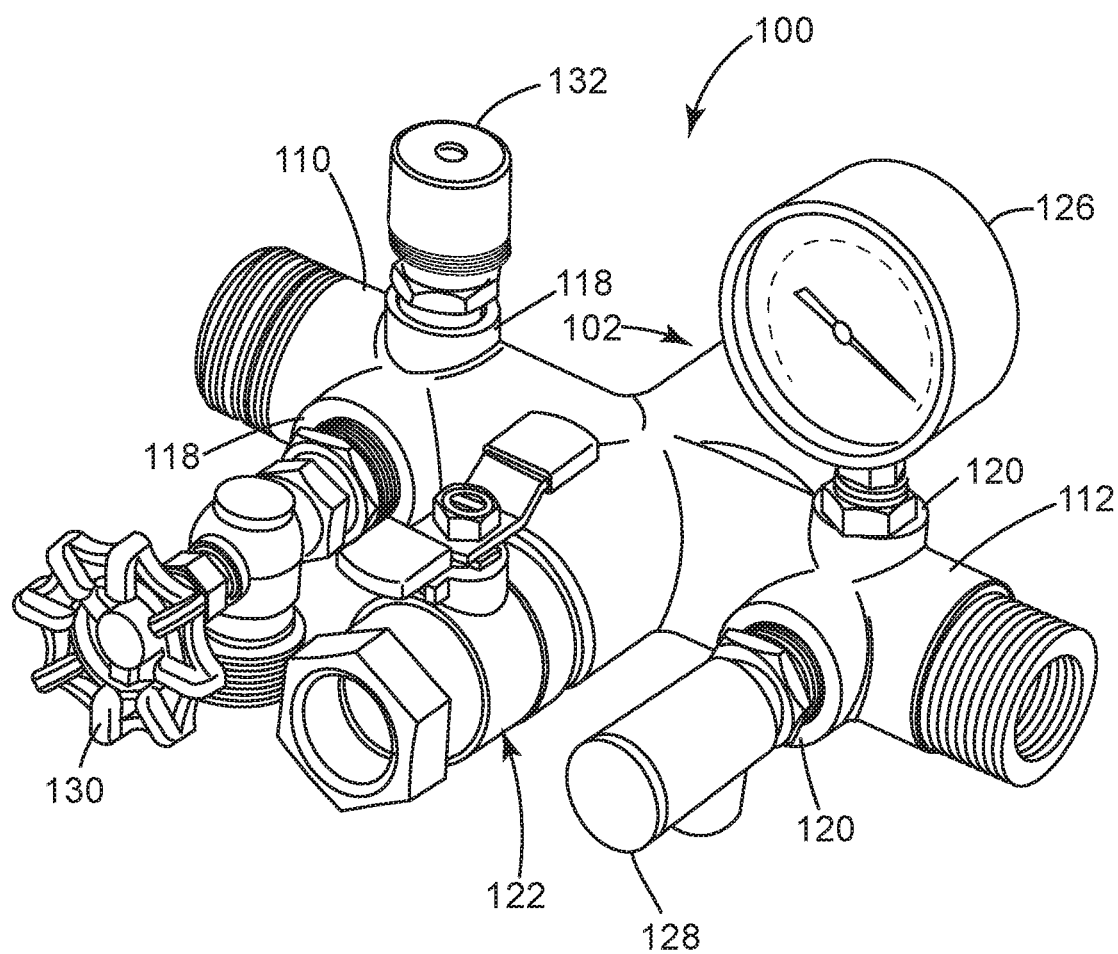
FIG. 4A depicts a perspective view of an exemplary embodiment of the tank tee assembly of FIG. 3 with a plurality of exemplary tank tee accessories mounted thereon, in accordance with the present invention.

Referring to FIGS. 4A, 4B, 4C, 4D and 4E, various views of the tank tee assembly 100 with a plurality of exemplary tank tee accessories 126, 128, 130, 132 mounted in the first and second taps 118, 120 are presented. More specifically:
  a. FIG. 4A is a perspective view of tank tee assembly 100;
  b. FIG. 4B is a bottom view of the tank tee assembly 100;
  c. FIG. 4C is a front view facing the ball valve assembly 122 end;
  d. FIG. 4D is a side view facing the first tank leg 110 end; and
  e. FIG. 4E is a side view facing the second tank leg 112 end.

The accessories include a pressure gage 126, a relief valve 128, a drain valve 130 and a pressure transducer 132. In this embodiment, the taps have female pipe threads (for example one quarter inch female national pipe threads (NPT) that are sized to receive the tank tee accessories. This ensures that they all are connected and hydraulically communicate with the main flow in tank tee passageway 108.

Referring to FIG. 5, a cross sectional view of the tank tee assembly 100 taken along the line 5-5 of FIG. 4C is presented. The ball valve assembly 122 includes a valve body 133. The valve body includes a valve inlet 134, a valve outlet 136 and a valve passageway 138 therebetween.

More specifically, the valve inlet 134 of the ball valve assembly 122 is in threaded engagement with the tank tee outlet 106 of the tank tee body 102. As such, when the water flow from a well exits the tank tee outlet 106, it enters the valve passageway 138 through the valve inlet 134 and exits the valve passageway 138 through the valve outlet 136.

The ball valve assembly 122 also includes a ball element 140 that is disposed within the valve passageway 138. The ball element 140 has a hollow central core 158 that aligns with the valve passageway 138 when the ball element 140 is in an open position. A first ball valve seat 142 is disposed within the valve passageway 138 between the tank tee outlet 106 of the tank tee body 102 and the ball element 140 of the ball valve assembly 122. A second ball valve seat 144 is also disposed within the valve passageway 138 between the valve outlet 136 and the ball element 140 of the ball valve assembly 122.

Advantageously due to the design of the threaded engagement between the valve inlet 134 and the tank tee outlet 106, the tank tee body 102 functions as a tailpiece for the ball valve assembly 122. That is, the valve inlet 134 is in threaded engagement with the tank tee outlet 106 such that the tank tee outlet 106 of the tank tee body 102 urges the first ball valve seat 142 into sealing engagement against the ball element 140. Once the sealing engagement of the first ball valve seat 142 against the ball element 140 is made by the tank tee body 102, the ball element 140 is effectively sandwiched into a sealing engagement between the first ball valve seat 142 and the second ball valve seat 144.

The tank tee assembly 100 also includes a poppet valve assembly 146 disposed in the tank tee passageway 108. The poppet valve assembly 146 includes a poppet 148 moveable between a closed position and an open position. Accordingly, when the poppet 148 is in the closed position the backflow of fluid from the tank tee outlet 106 to the tank tee inlet 104 is inhibited, and when the poppet is in the open position the flow of fluid from the tank tee inlet 104 to the tank tee outlet 106 is allowed.

Referring to FIG. 6A, an exemplary embodiment of a perspective view of the tank tee assembly 100 having a cut away view of the ball valve assembly 122 shown in circle 6A of FIG. 5 is presented. In this particular exemplary embodiment, the tank tee outlet 106 of the tank tee body 102 includes a male threaded end portion 149 disposed on an outer surface of the tank tee body 102. The male threaded end portion 149 includes a set of pipe threads. Additionally, the valve inlet 134 of ball valve assembly 122 includes a mating female threaded end portion 151 disposed on an inner peripheral surface of the valve body 122. The female threaded end portion also includes a set of threads. When the tank tee outlet 106 is threaded into the valve inlet 134, the first ball valve seat 142 is urged by the end portion of outlet 106 into sealing engagement against the ball element 140. Additionally, the ball element 140 presses against the second ball valve seat 144 to sealingly engage with it. The ball element 140 is then effectively sandwiched between the first and second ball valve seats 142, 144.

Referring to FIG. 6B, an exploded view of the ball valve assembly 122 of FIG. 6A is shown. The ball valve assembly 122 further includes a valve stem 150, a gland nut 152, a packing 153, a handle 154 and a nut 156, which are operatively assembled to pivot the ball element 140 within valve passage 138 between an open position and a closed position.

The hollow central core 158 of the ball element 140 aligns with the valve passageway 138 when the ball element is in the open position to allow flow from the valve inlet 134 to the valve outlet 136. When the valve is in the closed position, the core 158 is pivoted approximately 90 degrees to block flow through the valve passageway 138. The handle 154 is equipped with a tab that will give a positive indication of fully opened and fully closed positions of the ball valve when it engages a lug cast into the valve body.

Figure 7:
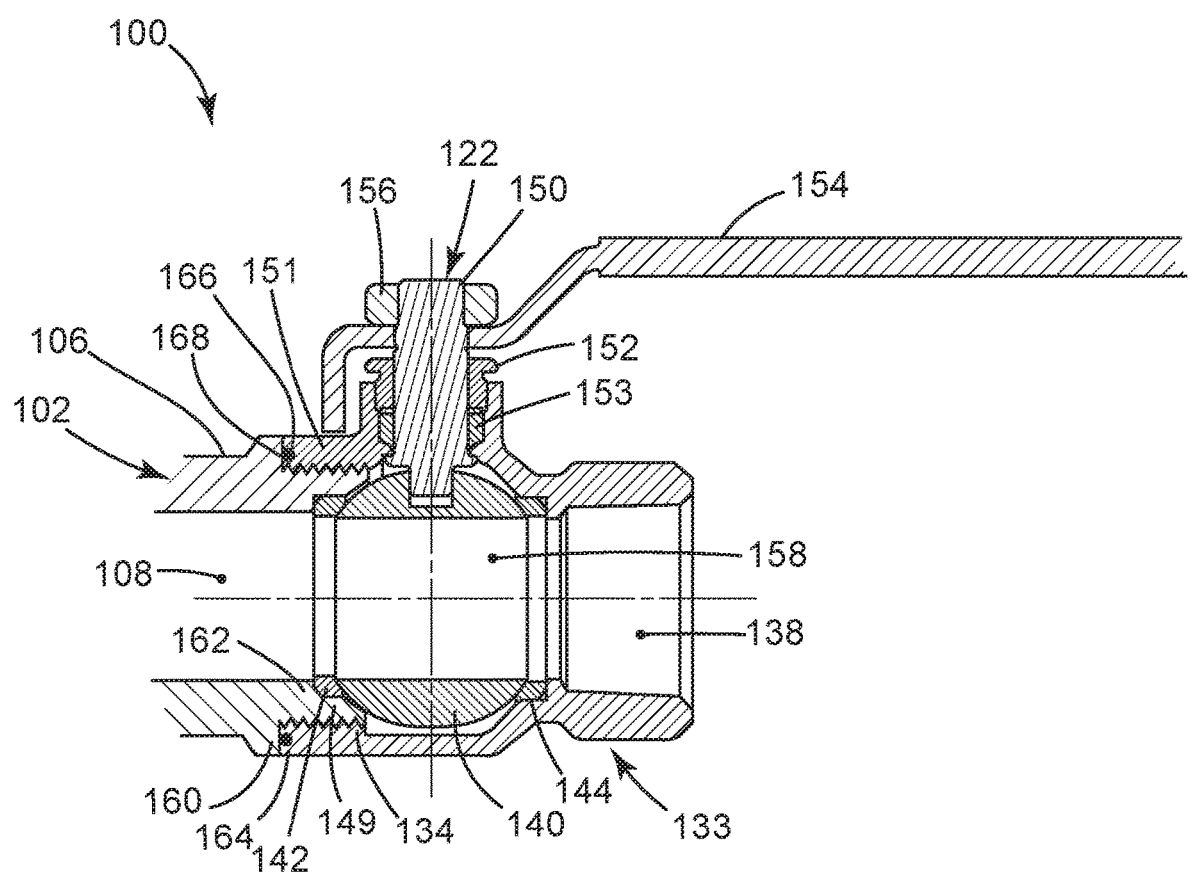
FIG. 7 depicts a side cross sectional view of an alternative exemplary embodiment of the ball valve assembly shown in circle 6A of FIG. 5, in accordance with the present invention.

Referring to FIG. 7, an alternative embodiment of the tank tee assembly 100 is presented. In this embodiment the male threaded end portion 149 of the tank tee outlet 106 and the female threaded end portion 151 of the valve inlet 134 are composed of straight threads.

In addition to the tank tee inlet 106 having a male straight threaded end portion 149, the tank tee inlet 106 also includes an outer annular shoulder 160 disposed on the outer surface of the tank tee body 102. The outer annular shoulder 160 is disposed proximate the male threaded end portion 149. In the exemplary embodiment of FIG. 7, the outer annular shoulder 160 is disposed adjacent the male threaded end portion 149.

Further, an inner annular shoulder 162 is disposed on an inner peripheral surface of the tank tee passageway 108. The inner peripheral surface defining the tank tee passageway 108 through the tank tee body 102. The inner annular shoulder 162 is disposed proximate the male threaded end portion 149 of the male threaded end portion 149. In the exemplary embodiment of FIG. 7, the inner annular shoulder 162 is disposed between the beginning and end of the male threaded end portion 149.

The valve inlet 134 has a mating female straight threaded end portion 151 disposed on the inner peripheral surface of the valve body 133. The inner peripheral surface defining the valve passageway 138 through the valve body 133.

Accordingly, when the male straight threaded end portion 149 of the tank tee outlet 106 engages with the female straight threaded end portion 151 of the valve inlet 134, a distal end 164 of the female threaded end portion 151 of the valve inlet 134 abuts against the outer annular shoulder 160 of the tank tee outlet 106. Additionally, the inner annular shoulder 162 of the tank tee outlet 106 abuts against the ball valve seat 142.

An "o" ring groove 166 is disposed in the distal end 164 of the female threaded end portion 151 and an "o" ring 168 is disposed in sealing engagement in the "o" ring groove 166. Therefore, when the male and female threaded end portions 149, 151 are in threaded engagement, the "o" ring 168 provides the seal that prevents water from leaking out of the tank tee assembly 100 where the end portions 149, 151 join.

Though the threaded engagement between the tank tee outlet 106 and valve inlet 134 has been described in the exemplary embodiments illustrated in FIGS. 6A, 6B and 7, other thread embodiments are also within the scope of this invention. For example, a threaded sleeve, having female threads, may be fit over a shoulder of the tank tee outlet 106 that is designed to thread over male threads on the valve inlet 134.

Advantageously, by designing the tank tee outlet 106 of the valve body 102 to press against and urge the first ball valve seat 142 against the ball element 140, the valve body 102 replaces the tailpiece of a conventional ball valve. Therefore, the conventional tailpiece, and the components required to connect the conventional tailpiece to the conventional tank tee assembly, may be eliminated.

Though the exemplary embodiments illustrated in FIGS. 6A, 6B and 7 show the tank tee outlet 106 pressing directly against the first ball valve seat 142 to seal against ball element 140, other embodiments are also within the scope of this invention. For example, a spacer (not shown) may be disposed between the tank tee outlet 106 and first ball valve seat 142, wherein the tank tee outlet 106 presses directly against the spacer (not shown) and the spacer urges the ball valve seat 142 into sealing engagement against the ball element 140.

Referring to FIGS. 8A, 8B and 8C, views of an exemplary embodiment of the poppet valve assembly 146 disposed in the tank tee passageway 108 are presented. More specifically, FIG. 8A is a perspective view of the poppet valve assembly 146 shown within circle 8A of FIG. 5. FIG. 8B is top perspective exploded view of the poppet valve assembly of FIG. 8A. FIG. 8C is a bottom perspective exploded view of a guide 184 of the poppet valve assembly 146.

The poppet valve assembly 146 is disposed in the tank tee passageway 108 proximate the tank tee inlet 104. The poppet 148 of the poppet valve assembly 146 sealingly engages with an annular flange 170. The annular flange 170 is disposed on the peripheral surface of the tank tee passageway 108 proximate the tank tee inlet 104.

The annular flange has a poppet valve seat 172 on the downstream side of the flange 170. The poppet valve seat 172, in this particular embodiment, is in the form of an "o" ring groove 172. However, the poppet valve seat 172 may take any suitable shape that enables the poppet 148 to seal with the flange 170. For example, the poppet valve seat may be a smoothly tapered surface that the poppet 148 and/or "o" ring can seal against.

The poppet 148 includes a rigid disk 176 and a stem 174 extending from the disk 176. The disk 174 is resiliently biased by a spring 178 to sealingly engage against the poppet valve seat 172 when the poppet 148 is in the closed position. The disk 176 is disengaged from the poppet valve seat 172 when the poppet 148 is in the open position.

The disk 176 has an outside diameter that is greater than an inside diameter of the annular flange 170 in order for the disk to be able to seal against the poppet valve seat 172 on the upstream side of the annular flange 170. The inside diameter of the annular flange 170 (often called the "poppet valve seat orifice" or "valve seat orifice") may be the greatest restriction to flow in the tank tee passageway 108 and, in order to reduce the flow restriction and pressure drop caused by the flange 170, the flange 170 may be made with as large an inside diameter as reasonably possible. For that reason, the outside diameter of the disk 176 may be made as close as reasonably possible to the inside diameter of the tank tee passageway 108. More specifically, the outside diameter of the disk 176 may be at least 75 percent, at least 80 percent, at least 85 percent, at least 90 percent or at least 95 percent of the inside diameter of the tank tee passageway.

The difference in area between the inside diameter of the tank tee assembly 108 and the outside diameter of the disk 176 is often called the "downstream doughnut area" because the disk 176 and passageway 108 form a generally doughnut shaped flow restriction when the poppet 148 is in its fully open position. In certain circumstances, in order to maximize flow through both the valve seat orifice area and the downstream doughnut area, the valve seat orifice area may be designed to be the same as the downstream doughnut area in passageway 108. Under those circumstances, the valve seat orifice diameter may be related to the inside diameter of the passageway 108 through the following equation: (valve seat orifice diameter)=((inside diameter of passageway^2)/2)^0.5, wherein the symbol "^" means "raised to the power of". This equates to a valve seat orifice diameter that is 70.7% of the inside diameter of the passageway 108.

Further, in tank tee assemblies used in water distribution systems, the back pressure in the poppet valve assembly is large. Therefore, in order to avoid being damaged by such back pressure and/or prevent being extruded through the annular flange 170 by the back pressure, the poppet valve assembly 146, and in particular the poppet 148, may have a high allowable operating pressure (that is, may be rated to operate without damage under a given allowable operating pressure). More specifically the poppet valve assembly and/or the poppet may have an allowable operating pressure of at least 50 pounds per square inch (psi), at least 100 psi or at least 150 psi.

In order to be rated at such allowable operating pressures, and be able to resist the corrosive effects of water, the poppet may be rigid and composed of water resistant materials. More specifically, the poppet may be composed of stainless steel, brass or other suitable metal.

The spring 178 in this exemplary embodiment is a conical spring having concentrically conical coils. The spring may be composed of stainless steel or other suitable type of water resistant spring wire. When the spring 178 is fully compressed, the coils align substantially in a single plane and concentrically within each other from the largest diameter coil to the smallest diameter coil. As such, the solid height of the fully compressed conical spring 178 is advantageously the diameter of the spring wire that the conical spring is formed from.

Even though the spring 178 in this embodiment is a conical spring, which has certain specific advantages that will be explained in greater detail herein, other straight or non-conical springs may also be used in some cases. Such springs will have a solid height that is greater than the diameter of its spring wire that must be taken into account when the poppet valve is in its fully open position.

The disk 176 includes a poppet "o" ring groove 180 having a poppet "o" ring 182 disposed therein. The poppet "o" ring 182 mates with the poppet valve seat 172 to seal off the flow of water when the poppet 148 is in the closed position.

The poppet valve assembly 146 also includes the guide (or stem guide) 184. The guide 184 may be composed of an acetal copolymer plastic such as Delrin®, which is manufactured by DuPont of Wilmington, Del., United States. The guide 184 may also be composed of any suitable thermoplastic.

The guide includes a rigid guide base 194 that has an outside diameter that is larger than the inside diameter of the annular flange 170. As will be explained in greater detail herein, the guide base 194 may be close to, or substantially the same as, the outside diameter of the disk 176 of the poppet 148 to provide support for the poppet in the fully open position. Accordingly, the guide base may have an outside diameter that is at least 75 percent, 80 percent, 85 percent, 90 percent or 95 percent of the inside diameter of the tank tee passageway 108.

The stem guide 184 also includes support arms 188 extending upwards from a peripheral portion of a downstream side 196 of the guide base 194. Arcuate tabs 190 are disposed on distal ends of the support arms 188. When the guide is not inserted into the tank tee passageway, the arcuate tabs 190 have a maximum outside diameter 198 that is larger than the inside diameter of the tank tee passageway 108. The support arms 188 are radially resilient, wherein they may be bent inwardly at their distal ends toward the center of the tank tee passageway by a radially applied force, and will return to their original position when the force is removed. As such, the tabs 190 may be biased inwardly by the same radially applied force to reduce the outside diameter of the tabs to less than the inside diameter of the tank tee passageway 108 in order to enable the stem guide 184 to fit into the passageway 108.

An annular groove 192 is disposed in the peripheral surface of the tank tee passageway 108, downstream of the annular flange 170 and upstream of the first and second tank tee legs (through-hole structures) 110, 112. The annular groove 192 may be at least 5 inches from a distal end of the tank tee outlet 106. The tabs 190 are sized to fit within the annular groove 192 to rigidly secure the guide 184 within the tank tee passageway 108. Accordingly, the entire poppet valve assembly is disposed in the tank tee passageway 108 between the annular flange 170 and the annular groove 192 and may be 6 inches or more from the tank tee outlet 106, or 5 inches or more from the tank tee outlet 106.

Though the example illustrated in FIG. 8A shows the guide 184 rigidly secured within the tank tee passageway 108 via the tabs 190 fitting into the annular groove 192, the scope of the invention may include other structures within the tank tee passageway 108 which rigidly secure the guide 184. For example, there may be an annular shoulder within the passageway 108, which the tabs 190 abut against, and a retaining ring disposed over the tabs 190 to hold the tabs in place. Wherein the annular shoulder and retaining ring combined form a type of annular groove.

The guide base 194 also includes an upstream side 200 (see FIG. 8C) having an outer circumferential portion 202 and an inner cavity portion 204. The inner cavity portion 204 is sized to receive the largest coil of the conical spring 178. A guide sleeve opening 185 to a guide sleeve 186 is disposed centrally in the inner cavity portion 204 of the upstream side 200 of the guide base 194. The guide sleeve 186 extends upwards from a center portion of the downstream side 196 of the guide base 194. The guide sleeve 186 has a cylindrically hollow interior extending downstream from the guide sleeve opening 185.

The spring 178 is disposed over the stem 174 of the poppet 148 between the upstream side 200 of the guide 184 and the moveable poppet 148 in a self-nesting fashion. The stem 174 of the poppet 148 fits slidably into the hollow interior of the guide sleeve 186, such that the guide sleeve 186 movably engages with the stem 174 as the disk 176 reciprocates from a closed position to a fully open position.

When the poppet is in a fully open position, the spring 178 is fully compressed into the cavity portion 204, and the disk 176 of the poppet 148 is flush against the circumferential portion 202 of the upstream side 200 of the guide base 194. As such, as will be explained in greater detail herein, the poppet 148 may advantageously function as a mechanical stop during assembly of the guide 148 into the tank tee passageway 108 from the tank tee outlet 106 without interference from the spring 178.

Advantageously, by disposing the poppet valve assembly 146 within the tank tee passageway 108, the tank tee body 102 serves as the body of the poppet valve assembly 146. Therefore, the conventional check valve, and the components required to connect the conventional check valve to the conventional tank tee assembly, may be eliminated. Accordingly, the tank tee passageway 108 is free of any threaded or welded connections between the annular groove 192 and the one or more through-hole structures (e.g., first and second tank legs 110, 112) that may be disposed in the tank tee body 102.

Additionally, the distance between the poppet valve assembly 146, or annular groove 192, and the through-hole structures 110, 112 can be made very small relative to prior art tank tee assemblies (e.g., such as tank tee assembly 10 of FIG. 1), due to the elimination of any threaded or welded fittings required to assemble the poppet valve assembly 146 to the tank tee inlet 104 of the tank tee body 102. For example, the distance between the poppet valve assembly 146, or annular groove 192, and the through-hole structures 110, 112 may be 4 inches or less, 2 inches or less, 1.5 inches or less, or 1 inch or less. By way of another example, the distance between the poppet valve assembly 146, or annular groove 192, and the through-hole structures 110, 112 may be equal to or less than twice the overall length of the poppet valve assembly 146 in its closed position. By way of another example, the distance between the poppet valve assembly 146, or annular groove 192, and the through-hole structures 110, 112 may be equal to or less than the overall length of the poppet valve assembly 146 in its closed position.

Comparatively, if the poppet valve assembly 146 were housed in a separate stand-alone body other than the tank tee body 102, then it would have to be connected with threaded or welded fittings. The threaded fittings may increase the length of the tank tee assembly 100 by several inches and add to the potential for leaks. The welded fittings would have to be several inches (e.g. 4 or more) away from the guide 184 or the heat of welding would damage the guide during the welding process (or about two lengths of the poppet valve assembly in its open position or more), therefore defeating the purpose of making the tank tee assembly 100 more compact.

However, in order to eliminate any such threaded or welded connections between the annular groove 192 and the through-hole structures 110, 112, the components of the poppet valve assembly 146 (i.e., the guide 184, the poppet 148 and the spring 178) must be assembled from the tank tee outlet 106 side of the tank tee body 102. This is because the annular flange 170 has an inner diameter that is smaller than the outer diameter of either of the poppet disk 176 or the guide base 194. Moreover, both the poppet disk 176 and the guide base 194 are too rigid to be forced through the inner diameter of the annular flange 170 without being damaged.

Assembling the poppet valve assembly 146 from the tank tee outlet side has not been done in previous prior art tank tee assemblies (such as prior art tank tee assembly 10) due to problems associated with the poppet 148 and/or guide 184 getting cocked and/or damaged when being forced through a long (e.g., 5 inches or more) tank tee passageway 108. Additionally, at least the tabs 190 of the guide 184 are likely to get caught and cocked on any of the through-hole structures 110, 112 in the tank tee passageway 108.

Moreover, the process of assembling the poppet valve assembly 146 from the tank tee outlet 106 side of the tank tee body 102 is essentially a blind process due to the long distance between the tank tee outlet 106 and the annular groove 192 (e.g., at least 5 inches or more). This makes properly positioning the guide 184 within the tank tee passageway 108 difficult, because it requires that the tabs 190 be accurately aligned with the annular groove 192 in order to secure the guide 184 in the tank tee passageway 108.

Additionally, the above described assembly problems are further exacerbated when working in a mass production basis. Accordingly, due at least to these difficulties, prior art tank tee assemblies (such as tank tee assembly 10 in FIGS. 1 and 2) have assembled prior art poppet valves assemblies (such as prior art check valve 34) to the tank tee inlet side of the tank tee body using threaded fittings only.

However, these assembly problems are overcome with a method of assembling a poppet valve assembly 146 into a tank tee assembly 100 illustrated herein, in accordance with the present invention. More specifically, these assembly problems are overcome with the method of assembly illustrated in FIGS. 13-21, wherein a method of assembling the poppet valve assembly 146 into the tank tee assembly 100 from the tank tee outlet 106 side of the tank tee body 102 in accordance with the present invention is discussed in detail.

Figure 9:
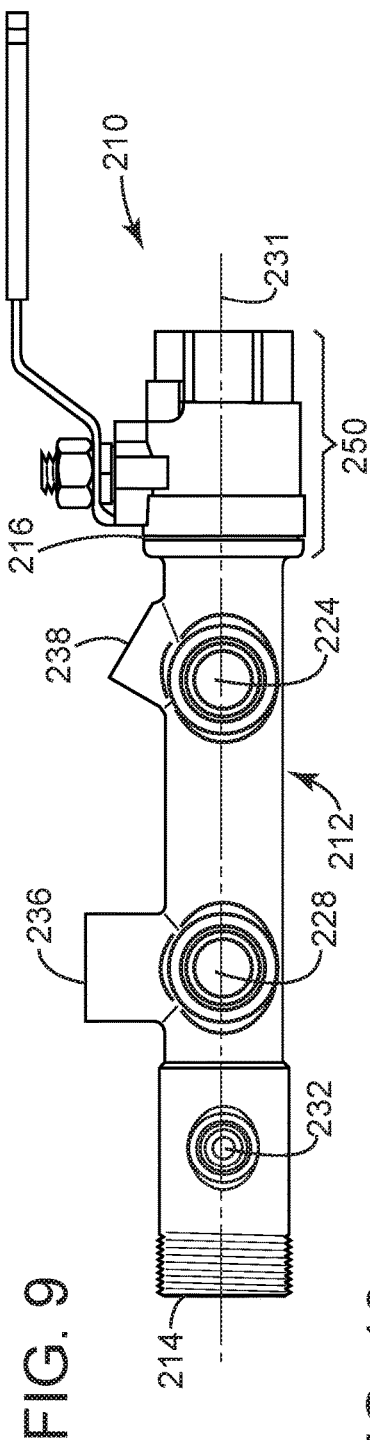
FIG. 9, depicts a side view of another exemplary embodiment of a tank tee assembly, in accordance with the present invention.
Figure 10:
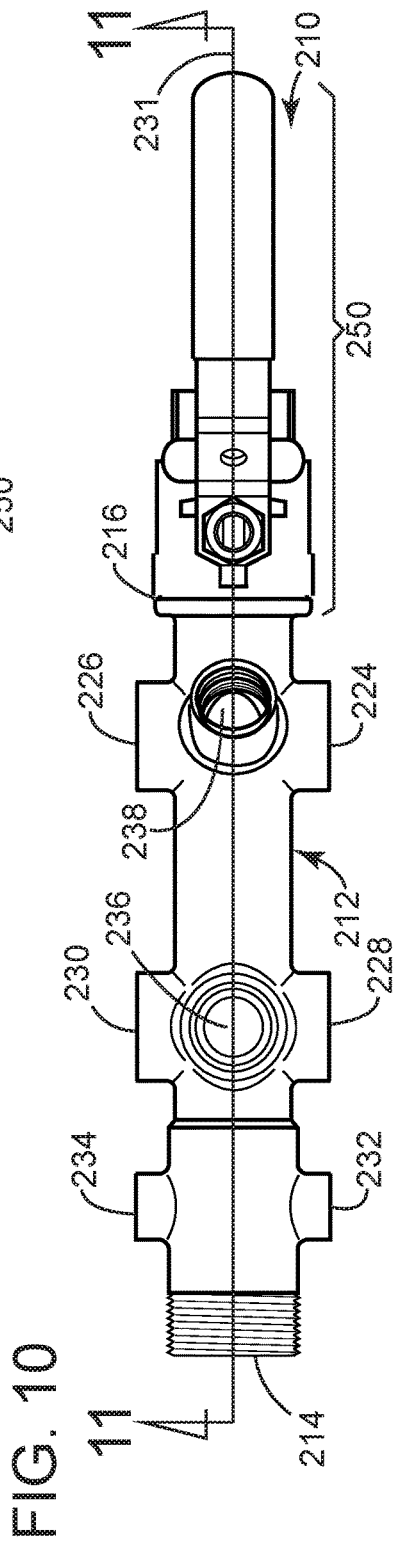
FIG. 10, depicts a top view of the exemplary embodiment of the tank tee assembly of FIG. 9, in accordance with the present invention.
Figure 11:
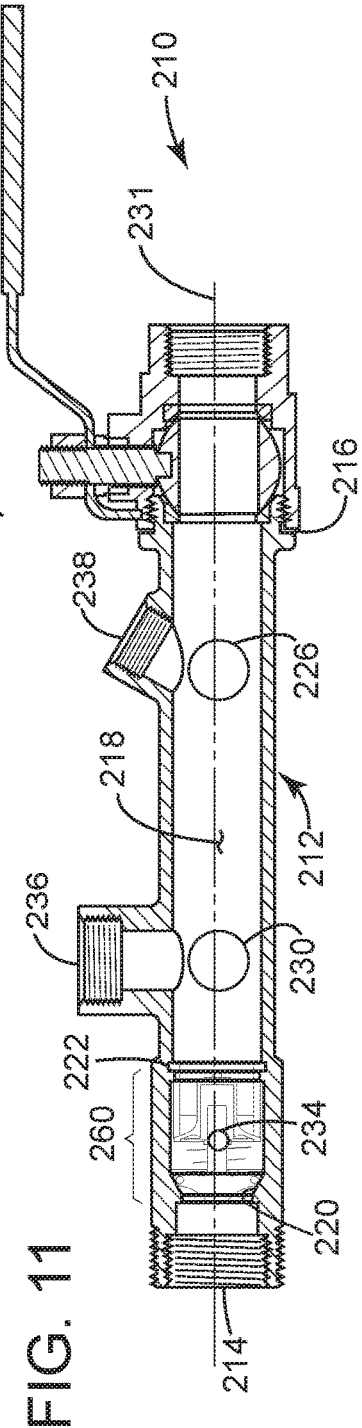
FIG. 11 depicts a cross-sectional view taken along the line A-A in FIG. 10 of the exemplary embodiment of the tank tee assembly of FIG. 10, in accordance with the present invention.

Referring to FIGS. 9, 10 and 11, a side view (FIG. 9) a top view (FIG. 10) and a cross sectional view (FIG. 11, i.e., a cross-sectional view taken along the line 11-11 in FIG. 10) of another exemplary embodiment of a tank tee assembly 210 is depicted in accordance with the present invention. In this embodiment, the tank tee body 212 includes three pairs of through-hole structures (i.e., a pair 224, 226, a pair 228, 230 and a pair 232, 234) disposed on opposing sides of the tank tee body 212. The tank tee body 212 also includes two through-hole structures 236, 238 disposed on top of the tank tee body 212. The distribution of the through-hole structures provide increased compactness in the tank tee assembly 210 relative to prior art tank tee assemblies. Additionally, the distribution of through-hole structures enable the tank tee assembly 210 to be reversibly installed. That is, the distribution of through-hole structures enable the tank tee assembly 210 to be installed in a well water system regardless of whether water flows from left to right or from right to left through the tank tee passageway 218.

The tank tee assembly 210 includes a tank tee body 212 including a tank tee inlet 214, a tank tee outlet 216 and a tank tee passageway 218 therebetween. An annular flange 220 is disposed on a peripheral surface of the tank tee passageway 218 proximate the tank tee inlet 214. An annular groove 222 is disposed in the peripheral surface of the tank tee passageway 218 downstream of the annular flange 220.

A ball valve assembly 250 is threadingly connected to the tank tee outlet 216 and a poppet valve assembly 260 (see FIG. 11) is disposed in the tank tee passageway 218 between the annular flange 220 and the annular groove 222. The poppet valve assembly 260 includes a poppet 262, a guide 264 and a spring 266 therebetween. The ball valve assembly 250 is substantially similar to the ball valve assembly 122 (see FIG. 5) and will not be discussed in detail herein.

Referring to FIGS. 12A and 12B, an exploded top perspective view (FIG. 12A) and bottom perspective view (FIG. 12B) of the poppet valve assembly 260 of FIG. 11 is depicted, in accordance with the present invention. The poppet valve assembly 260 is substantially similar to the poppet valve assembly 146 (see FIGS. 8A, B and C) and will be discussed in greater detail herein with regards to a method of assembling the poppet valve assembly 260 into the tank tee assembly 210 (see FIGS. 14-22). The poppet valve assembly 260 includes a poppet 262, a guide 264 and a conical spring 266 therebetween. The poppet 262 includes a disk 300 having a bottom surface 304 and a stem 302 extending from the disk 300.

The guide 264 has a rigid guide base 306, with support arms 308 extending upwards from a peripheral portion of a downstream side of the guide base 306, and arcuate tabs 310 disposed on distal ends of the support arms 308. The tabs 310 are positioned around a centerline 307 of the guide 264 at a maximum outside diameter 309. The guide 264 also includes a guide sleeve 311 extending upwards from a central portion of the downstream side of the guide base 306. The guide sleeve 311 has a hollow interior sized to slidably receive the stem 302 of the poppet 262. The guide base 306 of guide 264 includes an upstream side 318 having an outer circumferential portion 320 and an inner cavity portion 322. The inner cavity portion 322 is sized to receive the largest coil of the conical spring 266.

Referring again to FIGS. 9-11, at least one through-hole structure is disposed in the tank tee body 212 downstream of the annular groove 222, in accordance with the present invention. In the embodiment illustrated in FIGS. 9-11, there are at least 6 through-hole structures disposed in the tank tee body 212 downstream of the annular groove 222 and there are at least two through-hole structures disposed in the tank tee body 212 between the annular groove 222 and the annular flange 220.

More specifically, disposed on opposing sides of the tank tee body 212 are a pair of through-hole structures 224, 226 positioned proximate the tank tee outlet 216. Disposed on the same opposing sides of the tank tee body 212 are a pair of through-hole structures 228, 230 positioned between the pair of through-hole structures 224, 226 and the annular groove 222. Also disposed on the same opposing sides of the tank tee body 212 are a pair of through-hole structures 232, 234 positioned between the annular groove 222 and the annular flange 220. The pair 224, 226, pair 228, 230 and pair 232, 234 of through-hole structures may all have centerlines that pass through the centerline 231 of the tank tee passageway 218 in substantially the same plane.

Each through-hole structure pair (i.e., pair 224, 226, pair 228, 230 and pair 232, 234) may be equally sized to threadingly engage with the same accessory. For example, the pair of through-hole structures 224, 226 may be sized to engage with a drain valve 244 (see FIG. 13), the pair of through-hole structures 228, 230 may be sized to engage with a relief valve 246 (see FIG. 13), and the pair of through-hole structures 232, 234 may be sized to engage with a pressure gage 248 (see FIG. 13).

Two additional through-hole structures 236 and 238 are disposed on the top of the tank tee body 212. The through-hole structure 236 may be sized to receive a water tank 240 (see FIG. 13). The through-hole structure 238 may be sized to receive another accessory, such as a pressure transducer 242 (see FIG. 13). The through-hole structures 236, 238 on top of the tank tee body 212 may have centerlines that pass through the centerline of the tank tee passageway 218 at substantially right angles to the centerlines of the first 224, 226, the second 228, 230 and the third 232, 234 pair of through-hole structures.

In many well water systems, tank tee assemblies must be installed against a wall or barrier and within a limited space, wherein only one side of the assemblies are accessible. Because it is difficult and undesirable to disassemble and reassembly the check valve assembly (disposed on the inlet of a tank tee assembly) and the ball valve assembly (disposed on the outlet of a tank tee assembly), prior art tank tee assemblies are often sold commercially as "right hand" assemblies or as "left hand" assemblies. In a prior art "right hand" tank tee assembly, the check valve and inlet (such as check valve 34 and inlet 14 in FIG. 2) are on the right hand end of the assembly and the accessories are mounted on an outwardly facing accessible side of the assembly. In a prior art left hand tank tee assembly, the check valve and inlet are on the left hand end of the assembly and the accessories are mounted on an opposing outwardly facing accessible side of the assembly.

Advantageously in the embodiment of the tank tee assembly 210, having each pair of through-hole structures (i.e., the 224, 226, the pair 228, 230 and the pair 232, 234) mounted on opposing sides of the tank tee body 212, enables accessories 244, 246, 248 (see FIG. 13) to be mounted in one through-hole structure of each pair, while the other through-hole structure of the pair may be plugged with a pipe plug. Accordingly, either side of the tank tee body 212 may have accessories mounted on it, while the other side may be plugged and vice versa.

As such the tank tee assembly 210 may be reversibly installed. That is, the tank tee assembly 210 may be installed in a well water system regardless of whether the inlet 214 is on the left end and water flows from left to right through the passageway 218, or whether the inlet 214 is on the right end and water flows from right to left through the tank tee passageway 218. Only the accessories on the side of the tank tee body 212 have to be disconnected from one side of the assembly 210 and reconnected to the other side of the assembly when the tank tee assembly is rotated 180 degrees to accommodate water flow from left to right or from right to left through the tank tee passageway 218.

Also, advantageously in the unique embodiment of the tank tee assembly 210, having each pair of through-hole structures (i.e., the 224, 226, the pair 228, 230 and the pair 232, 234) mounted on opposing sides of the tank tee body 212, enables accessories 244, 246, 248 (see FIG. 13) to be mounted in both through-hole structure of each pair. Therefore, typical control and monitoring accessories (such as pressure gages 248, pressure transducers 242, pressure relief valves 246, drain valves 244 or the like) may be mounted on one side of the tank tee assembly 210, while other types of accessories (such as yard hydrants, hot water boilers, other water tanks or the like) may be mounted on the opposite side of the tank tee assembly 210.

Figure 13:
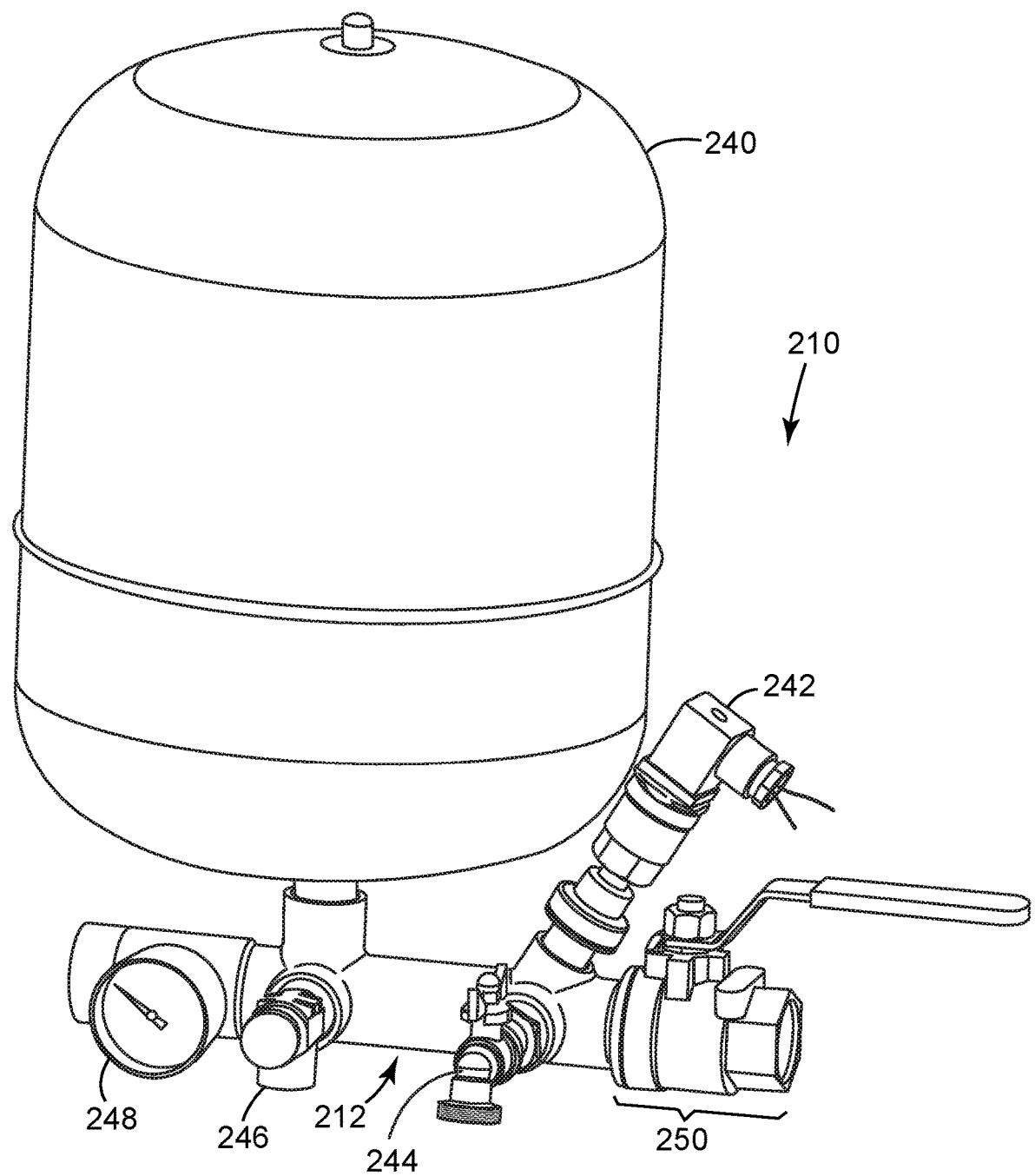
FIG. 13 depicts a perspective view of the tank tee assembly of FIGS. 9-11 with a water tank and accessories, in accordance with the present invention.
Figure 14:
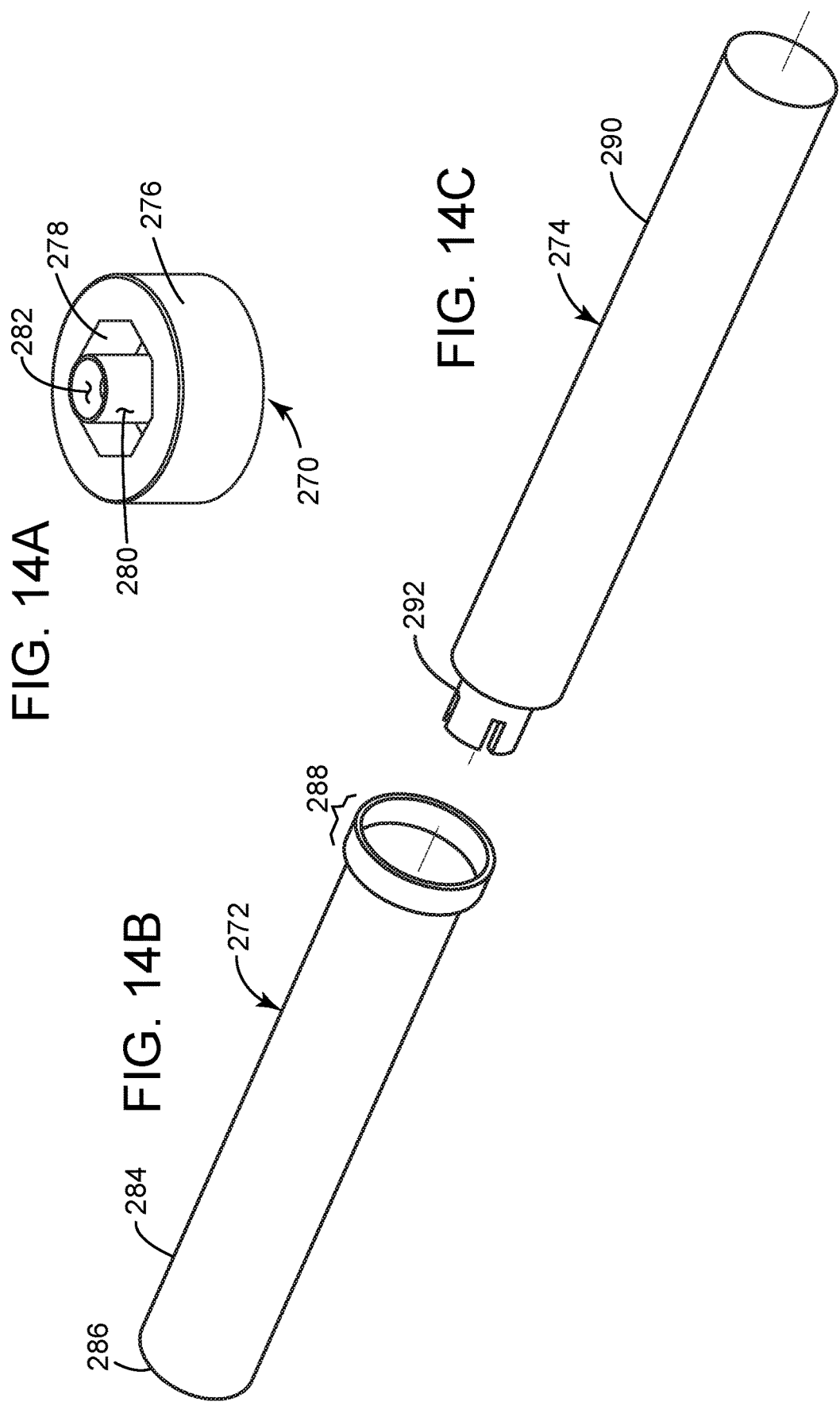
FIG. 14A depicts a perspective view of an exemplary embodiment of a base tool use to implement a method of assembling the poppet valve assembly into the tank tee body, in accordance with the present invention.
FIG. 14B depicts a perspective view of an exemplary embodiment of a sleeve tool use to implement a method of assembling the poppet valve assembly into the tank tee body, in accordance with the present invention.
FIG. 14C depicts a perspective view of an exemplary embodiment of a probe tool use to implement a method of assembling the poppet valve assembly into the tank tee body, in accordance with the present invention.

Referring to FIG. 13, a perspective view of the tank tee assembly 210 of FIGS. 9-11 with a typical water tank 240 and accessories 242, 244, 246, 248 is depicted in accordance with the present invention. The tank tee assembly 210 includes the water tank 240 mounted in through-hole structure 236, disposed on the top side of the assembly 210. A pressure transducer 242 is mounted in through-hole structure 238, also disposed on the top side of the assembly 210

A water drain valve 244 is mounted in through-hole structure 224, a pressure relief valve 246 is mounted in through-hole structure 228 and a pressure gage 248 is mounted in through-hole structure 232 (best seen in FIG. 10), wherein all through-hole structures 224, 228 and 232 are disposed on one accessible side of the assembly 210. The remaining through-hole structures 226, 230 and 234 (see FIG. 10) on the opposite side of the assembly 210 are plugged with pipe plugs (not shown). The tank tee inlet 214 is on the left side of the assembly 210 and the ball valve assembly 250 is connected to the tank tee outlet 216 on the right side of the assembly. Therefore, in this case, water flow through the tank tee passageway 218 would be from left to right.

To accommodate water flow from right to left, the drain valve 244, pressure relief valve 246 and pressure gage 248 would have to be mounted in through-hole structures 226, 230 and 234 respectively and through-hole structures 224, 228 and 232 would have to be plugged. Thereafter, the tank tee assembly would only need to be rotated 180 degrees so that the tank tee inlet 214 is on the right side of the assembly 210.

The following FIGS. 14-25 illustrate a method of assembling the poppet valve assembly 260 into the tank tee assembly 210. More specifically, FIGS. 14-23 depict a method of, and tooling for, assembling the poppet valve assembly 252 into the tank tee assembly 210 from the tank tee outlet 216 side of the tank tee body 212 in accordance with the present invention. FIGS. 24-25 depict exemplary embodiments of flow diagrams of the method illustrated in FIGS. 14-23, in accordance with the present invention.

Referring to FIGS. 14A, 14B and 14C perspective views of an exemplary embodiment of a base tool 270 (FIG. 14A), a sleeve tool 272 (FIG. 14B) and a probe tool 274 (FIG. 14C) is depicted in accordance with the present invention. The base tool 270, sleeve tool 272 and base tool 274 are tooling used to implement a method of assembling the poppet valve assembly 260 into the tank tee body 210, is depicted in accordance with the present invention.

Figure 15:
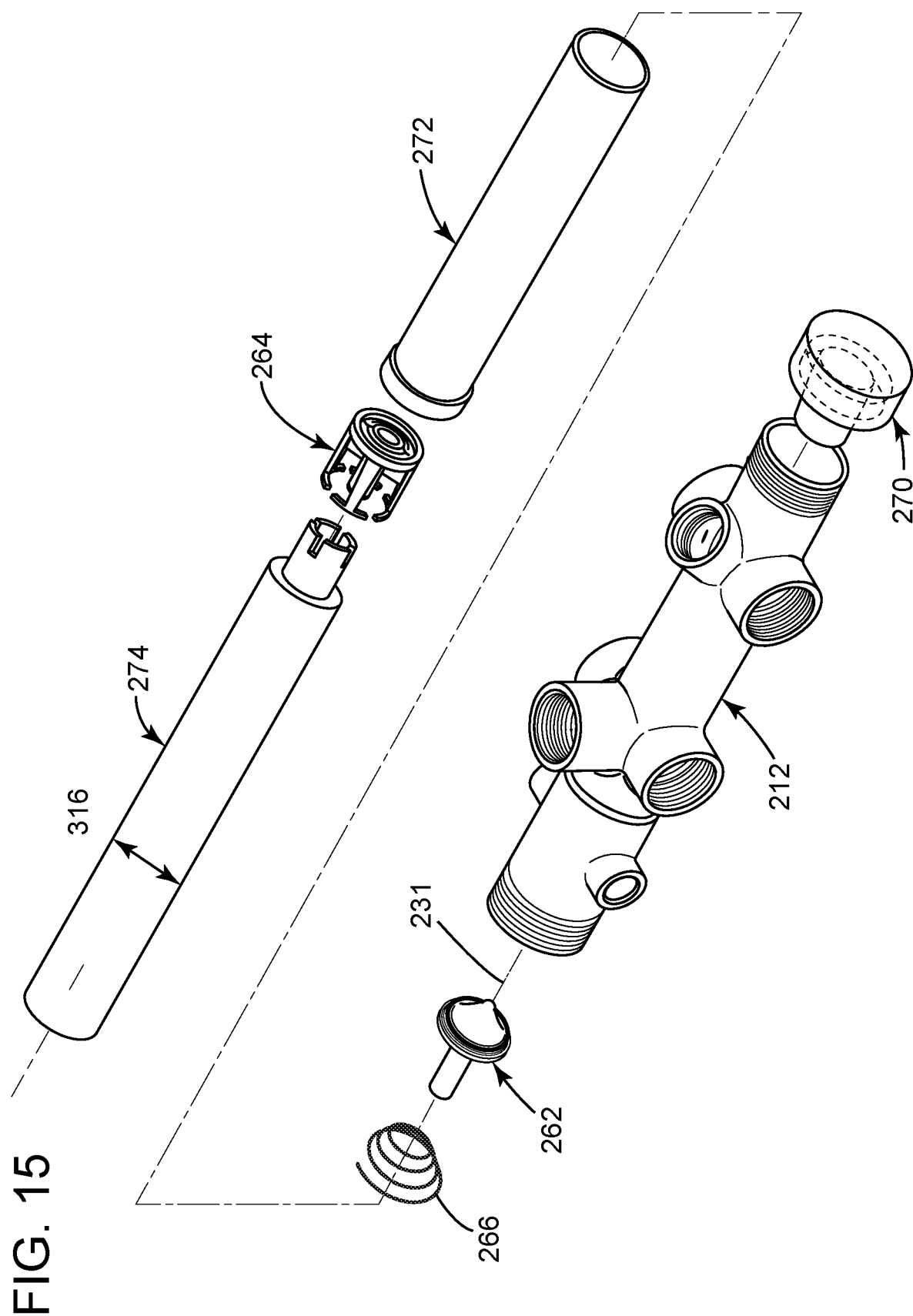
FIG. 15 depicts an exploded view of an exemplary embodiment of the tank tee body and poppet valve assembly of FIG. 13, as well as the base tool, sleeve tool and probe tool used to implement a method of assembling the poppet valve assembly into the tank tee body, in accordance with the present invention.

Referring also to FIG. 15, an exploded view of an exemplary embodiment of the tank tee body 212, the poppet valve assembly 260 and tooling 270, 272, 274 used to implement the method of assembling the poppet valve assembly 260 into the tank tee assembly 210, is depicted in accordance with the present invention. The components of the tank tee assembly 210 and poppet valve assembly 260 that are the same or substantially similar to previously discussed components in FIGS. 9-13 will have the same reference numbers.

The base tool 270 is used to support the tank tee body 212 in an upright vertical position when it is mounted on the base tool. The base tool 270 in this embodiment includes a generally cylindrical outer body portion 276, an inner cavity portion 278 and a generally cylindrical central protrusion 280 projecting upwards from the floor of the inner cavity portion 278. Though the outer body portion 270 is cylindrically shaped in this embodiment, the outer body portion 270 may have any shape that can reasonably provide support for the tank tee body 212 when it is mounted on the base tool 270. The protrusion 280 includes a top surface 282 that is configured to support the bottom surface 304 of the disk 300 of the poppet 262.

The sleeve tool 272 is sized to fit into the tank tee passageway 218 and used to enable the guide 264 to slide past the through-hole structures 224, 226, 228, 230, 236, 238 in the tank tee body 212. The sleeve tool 272 includes a tubular section 284 having a lower distal end 286. The tubular section is integrally connected to an upper rim 288.

The probe tool 274 includes a handle portion 290 integrally connected to a tong portion 292. The handle portion is sized to fit into the inside diameter of the tube portion 284 of the sleeve tool 272, the tong portion 292 is configured to grip the guide 264 of the poppet valve assembly 260.

Figure 16:
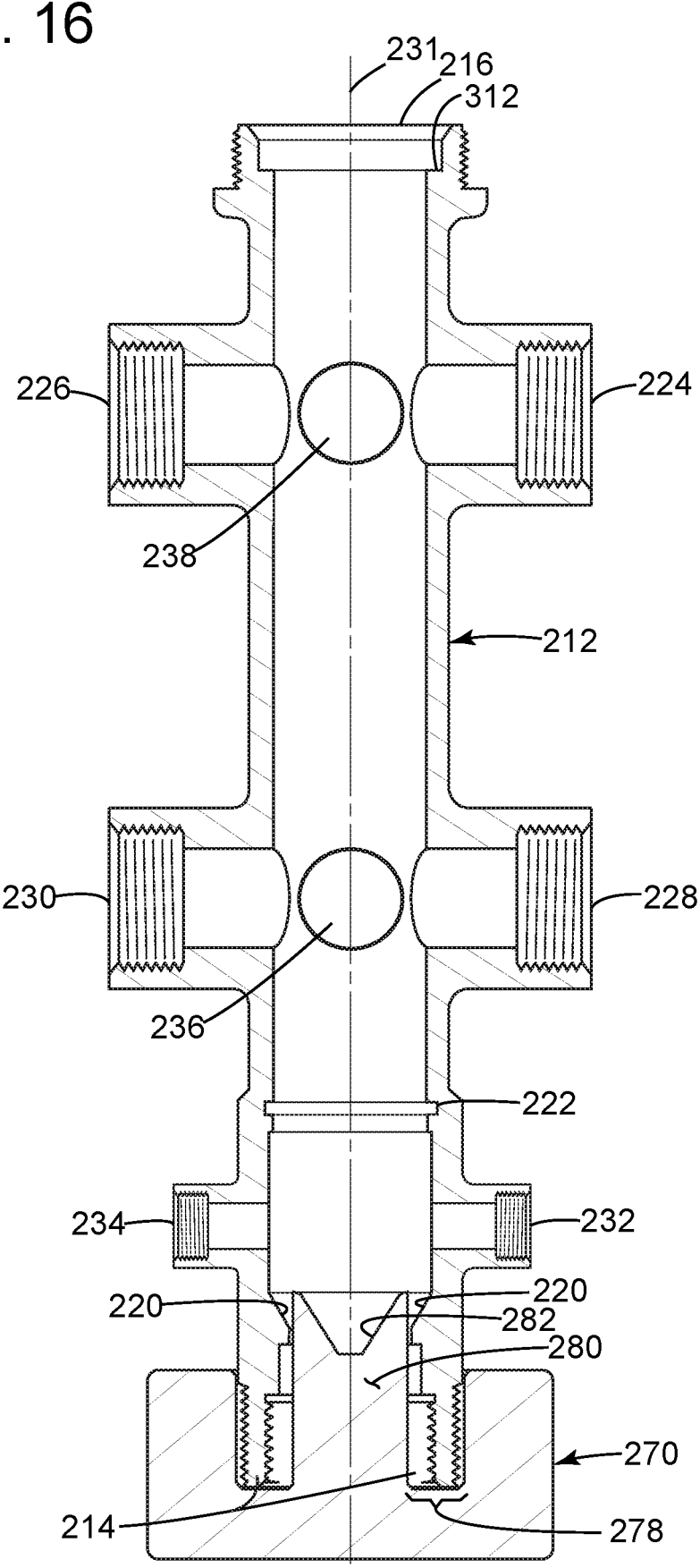
FIG. 16 depicts a cross sectional view of an exemplary embodiment of an initial stage of the method, in accordance with the present invention, wherein the tank tee body of the tank tee assembly is mounted onto the base tool.

Referring to FIG. 16, a cross sectional view of an exemplary embodiment on an initial stage of the method is depicted in accordance with the present invention, wherein the tank tee body 212 of the tank tee assembly 210 is mounted onto the base tool 270. The tank tee inlet 214 is mounted onto the base tool 270, such that the tank tee inlet 214 is inserted into the inner cavity 278 and the tank tee body 212 is supported vertically by the outer body portion 276 of the base tool 270. The central protrusion 280 of the base tool 270 extends downstream into the tank tee passageway 218 past the annular flange 220.

Figure 17:
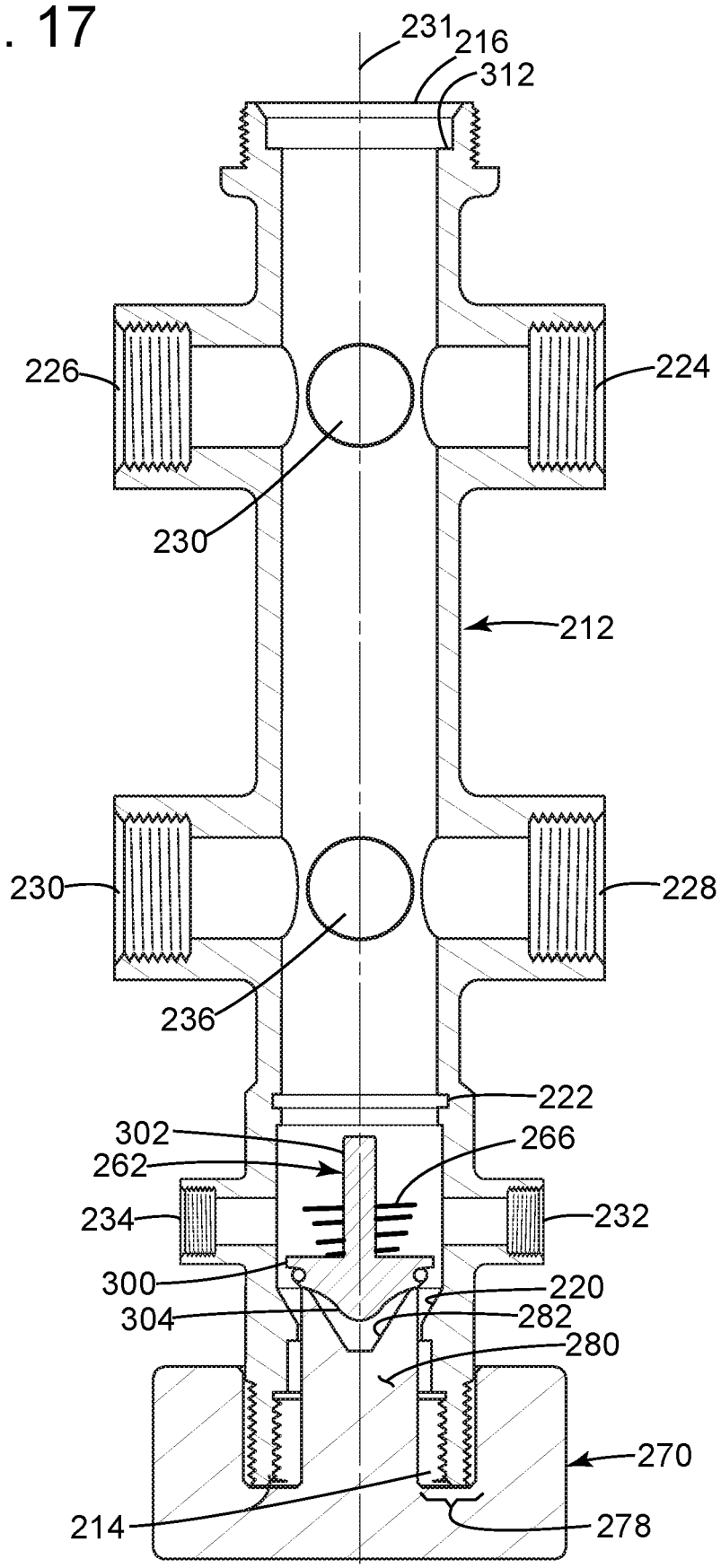
FIG. 17 depicts a cross sectional view of an exemplary embodiment of the next stage of the method, in accordance with the present invention, wherein a poppet is inserted through a tank tee outlet.

Referring to FIG. 17, a cross sectional view of an exemplary embodiment of the next stage of the method is depicted in accordance with the present invention, wherein the poppet 262 is inserted through the tank tee outlet 216. The poppet 262 is inserted through the tank tee outlet 216 and slips through the tank tee passageway 218 until the bottom surface 304 of the disk 300 abuts against the top surface 282 of the protrusion 282. The protrusion 280 has a predetermined height above the floor of the inner cavity portion 278 of the base tool 270 such that the top surface 282 of the protrusion 280 positions the disk 300 in its fully open position.

The spring 266 has substantially the same form and function as the spring 178 (see FIGS. 8A, B and C). Accordingly, the spring 266 is a conical spring and may be inserted over the stem 302 of the poppet 262 either at the same time as the insertion of the poppet 262 or after the insertion of the poppet 262.

Figure 18:
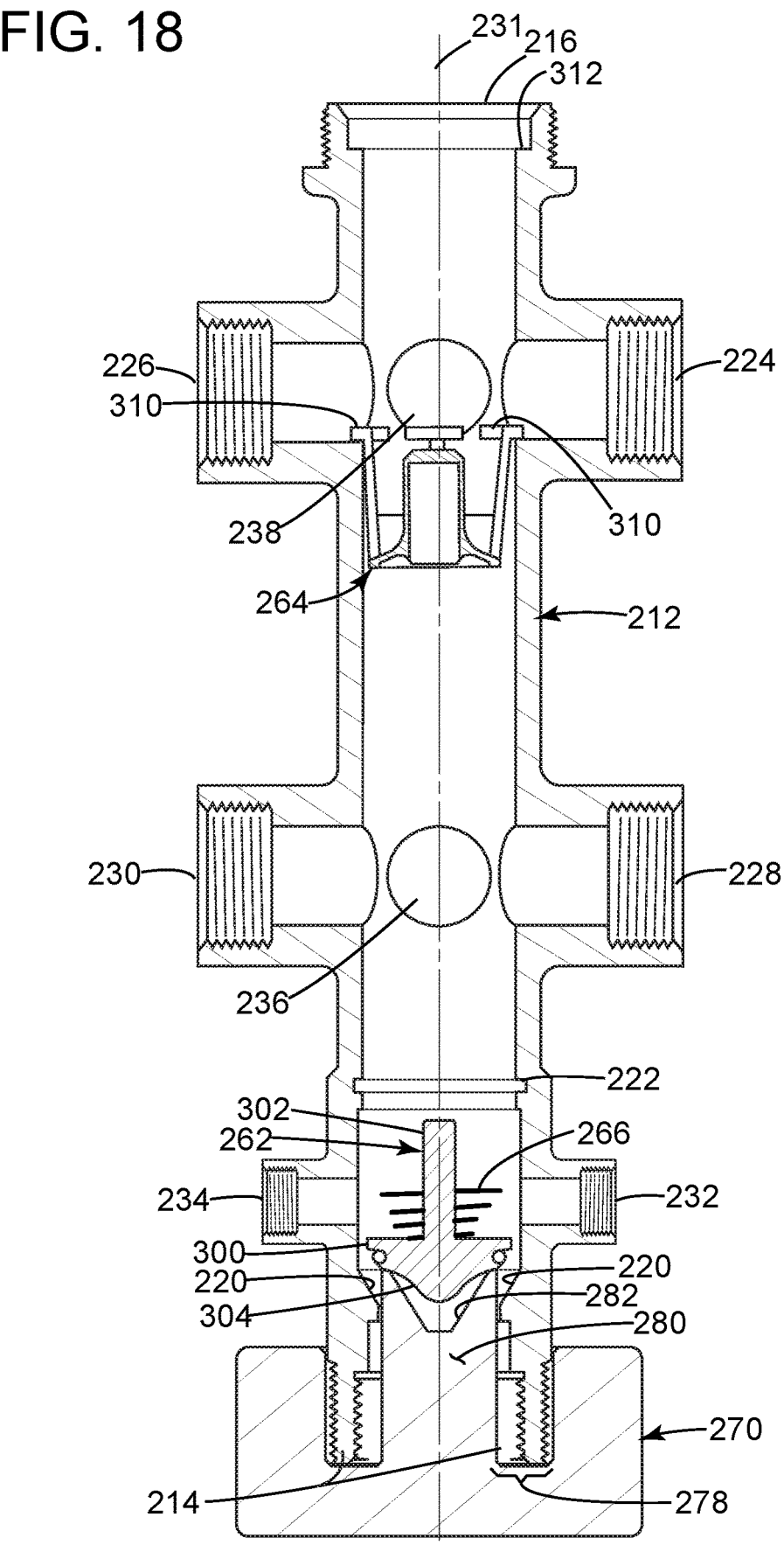
FIG. 18 depicts a cross sectional view of an exemplary embodiment of a guide part way down the tank tee passageway, wherein the guide is caught on a through-hole structure.

Referring to FIG. 18, a cross sectional view of an exemplary embodiment of the guide 264 part way down the tank tee passageway 218 is depicted, wherein the guide 264 is caught on an inner perimeter of the through-hole structure 224. FIG. 18 illustrates a problem that would occur if the method of assembly in accordance with the present invention is not followed.

The arcuate tabs 310 have a maximum outside diameter 309 that is larger than the inside diameter of the tank tee passageway 218. The tabs 310 are also radially resilient and may be biased inwardly to reduce the outside diameter of the tabs 310 and enable the guide 264 to fit into the tank tee passageway 218. However, when the tabs 310 encounter any through-hole structure (such as through-hole structures 224, 226, 228, 230, 236 or 238), the tabs move into the void created by the through-hole structure as the tabs attempt to expand back to their original maximum outside diameter 309. As such the tabs 310 may get caught on the inner perimeter of the through-hole structure. Forcing the tabs 310 past the through-hole structure at that point may damage the tabs.

Figure 19:
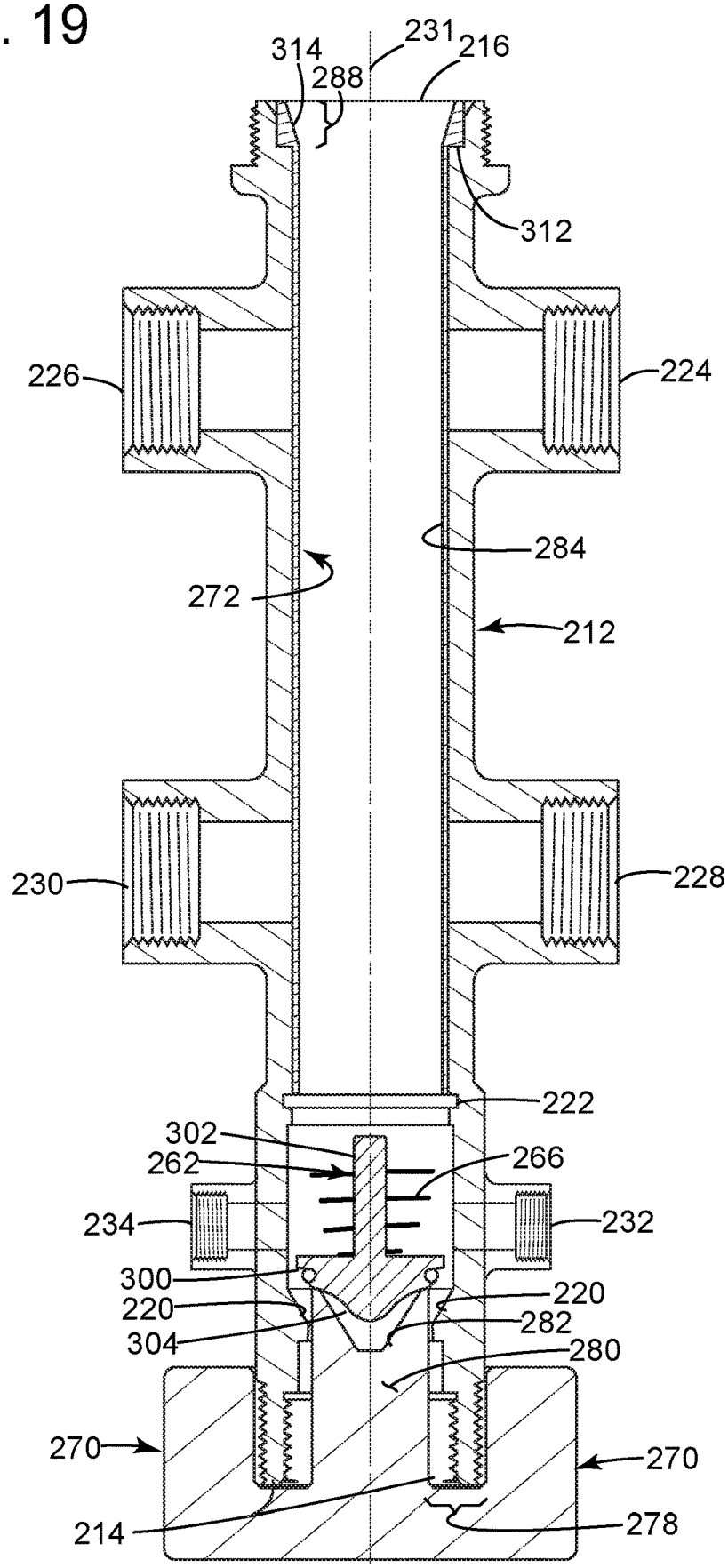
FIG. 19 depicts a cross sectional view of an exemplary embodiment of the next stage of the method, in accordance with the present invention, wherein the sleeve tool is inserted into the tank tee passageway through the tank tee outlet and the guide is partially inserted into the sleeve too.

Referring to FIG. 19, a cross sectional view of an exemplary embodiment of the next stage of the method is depicted in accordance with the present invention, wherein the sleeve tool 272 is inserted into the tank tee passageway 218 through the tank tee outlet 216 and the guide 264 is partially inserted into the sleeve tool 272. The upper rim 288 of the sleeve tool 272 is configured to mount against an inner annular shoulder 312 of the tank tee body 212. The inner annular shoulder 312 is disposed on the peripheral surface of the tank tee passageway 218 proximate the tank tee outlet 216. The inner annular shoulder 312 may be similar in form and function to the inner annular shoulder 162 (see FIG. 7), wherein the inner annular shoulder 312 abuts against a seat of the ball valve assembly 250 when the ball valve assembly 250 is threadingly engaged with the tank tee outlet 216 of the tank tee assembly 210.

When the upper rim 288 of the sleeve tool 272 is mounted against the inner annular shoulder 312, the tubular section 284 of the sleeve tool 272 extends past the through-hole structures and the distal end 286 of the sleeve tool 272 is positioned proximate the annular groove 222. For example, the distal end 286 of the sleeve tool 272 may be within 5 millimeters (mm) or less, 3 mm or less, or 2 mm or less of the annular groove 222. The distal end 286 may not extend past the edge of the annular groove 286.

In this exemplary embodiment of FIG. 19, the upper rim 288 is illustrated as mounting against the inner annular shoulder 312. However, it is within the scope of this invention, that the upper rim 288 may also be configured to mount against a distal end of the tank tee outlet 216.

The upper rim 288 of the sleeve tool 272 has an inwardly tapered inner surface 314. The inwardly tapered surface 314 urges the tabs 310 of the guide 264 radially inward toward the centerline 231 of the tank tee passageway 218 when the guide 264 is pushed into the sleeve tool 272.

Figure 20:
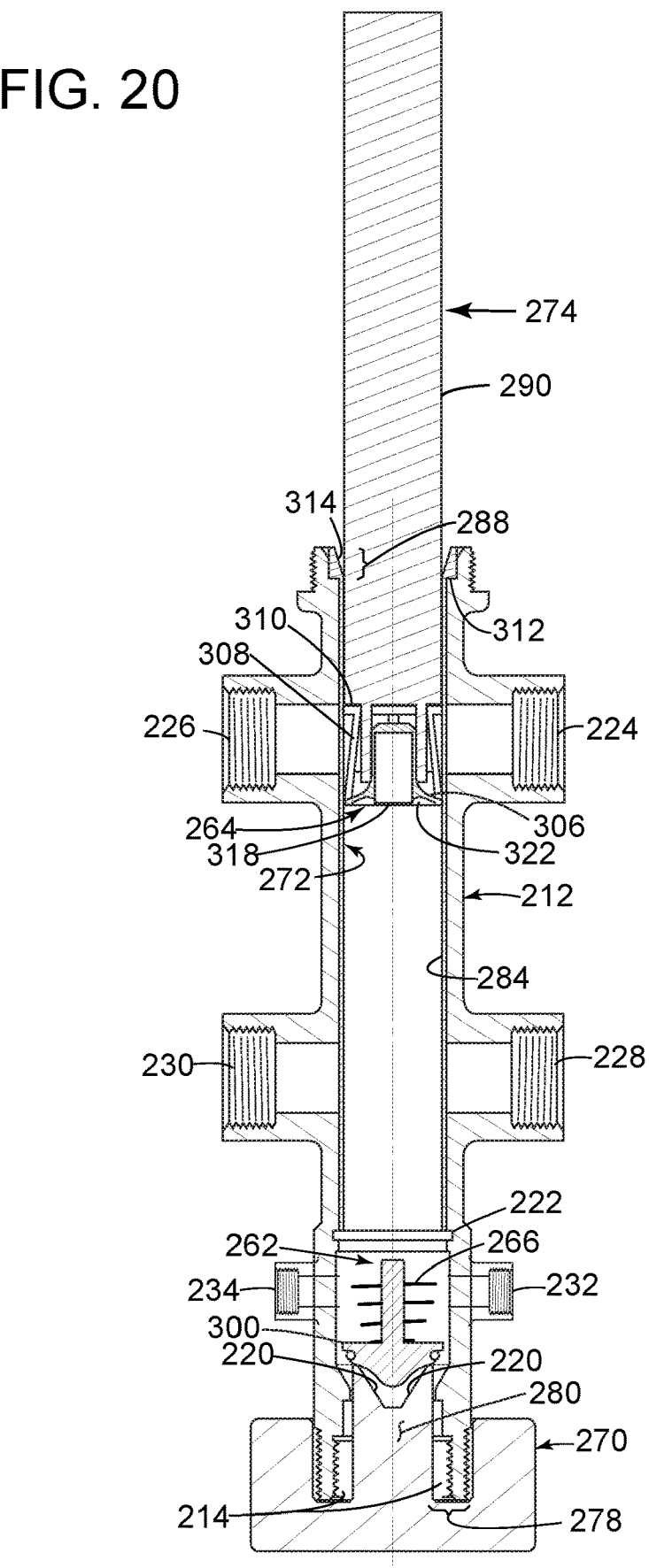
FIG. 20 depicts a cross sectional view of an exemplary embodiment of the next stage of the method, in accordance with the present invention, wherein the guide is inserted part way through the sleeve tool with the probe tool.

Referring to FIG. 20, a cross sectional view of an exemplary embodiment of the next stage of the method is depicted in accordance with the present invention, wherein the guide 264 is inserted part way through the sleeve tool 272 with the probe tool 274. The tong portion 292 of the probe tool 274 fits in a close slip fit over the guide sleeve 311 of the guide 264 to insert the guide into the sleeve tool 272. The inwardly tapered inner surface 314 urges the tabs 310 of the guide 264 radially inward toward the centerline 231 of the tank tee passageway 218 so that the tabs 310 of the guide 264 fit into inner diameter of the tubular section 284 of the sleeve tool 288 as the probe tool 274 pushes the guide 264 downward. The inner surface of the tubular section 284 prevents the tabs 310 of the guide 264 from getting caught on any through-hole structures.

The outside diameter 316 of the probe tool handle 290 is close to the inside diameter of the tubular section 284 of the sleeve tool 272. For example, the outside diameter of the handle 290 may be at least 75 percent, at least 80 percent, at least 90 percent or at least 95 percent of the inside diameter of the tubular section 284 of the sleeve tool 272. The combination of the tong portion 292 of the probe tool 274 slip fitting over the guide sleeve 311 of the guide 264 combined with the outside diameter of the handle 290 being close to the inside diameter of the tubular section 284, keeps the centerline 307 of the guide 264 closely aligned with the centerline 231 of the tank tee passageway 218 as the guide is inserted through the sleeve tool 272. In other words the guide 264 is prevented from being cocked relative to the centerline 231 of the tank tee passageway 218 as it is pushed through the tubular section 284 of the sleeve tool 272.

Because the diameter of the base 306 of the guide 264 may be as much as 95 percent of the inside diameter of the tank tee passageway 218, the walls of the tubular section 284 of the sleeve tool 272 must be made very thin and very relatively long. For example, the walls to the tubular section 284 may be more than 5 inches long and the thickness of the walls may be less than 0.05 inches, or less than 0.03 inches. As such the sleeve tool 272 may be made of a suitable thermal plastic (such as acrylonitrile butadiene styrene (ABS) or polylactic acid (PLA)) and may be manufactured in a 3D printing process to obtain the required length and thickness of the tubular walls.

Figure 21:
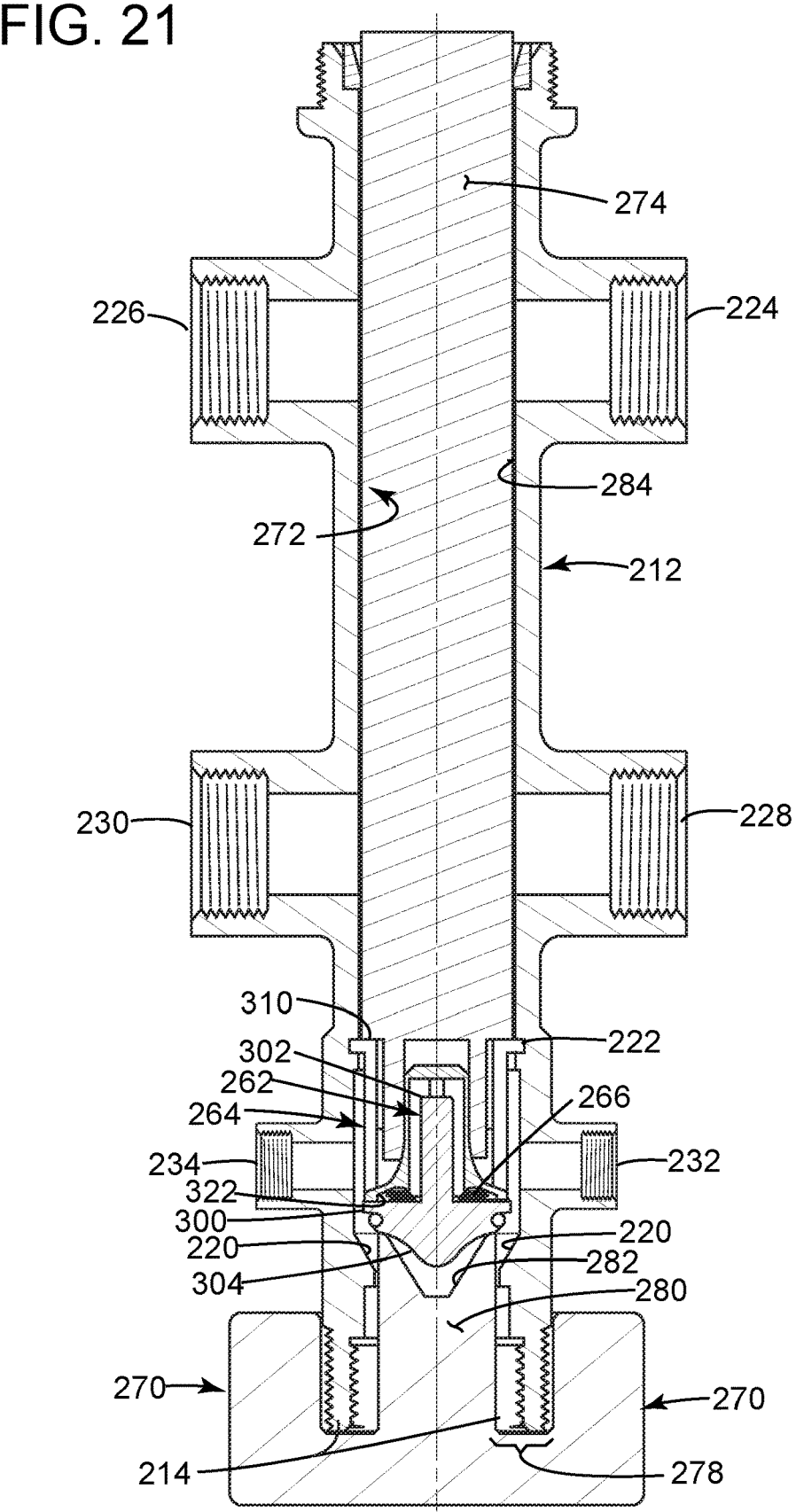
FIG. 21 depicts a cross sectional view of an exemplary embodiment of the next stage of the method, in accordance with the present invention, wherein the guide is inserted all the way through the sleeve tool.

Referring to FIG. 21, a cross sectional view of an exemplary embodiment of the next stage of the method is depicted in accordance with the present invention, wherein the guide 264 is inserted all the way through the sleeve tool 272. By utilizing the probe 274, the guide 264 is inserted through the tubular section 284 of the sleeve tool 274 until the base 306 of the guide 264 is supported by the poppet 262 and the protrusion 280 of the base tool 270. The poppet 262 and protrusion 280 position the guide 264 so that the tabs 310 of the guide 264 snap or fit into the annular groove 222 of the tank tee body 212 to rigidly secure the guide 264 within the tank tee passageway 218, when the tabs 310 are released from the distal end 286 of the sleeve tool 274.

When the guide 264 is snap into the annular groove 222 it will also uniquely capture and lock the spring 266 in place under slight tension. This helps to reduce hydraulic shocks or "water hammer."

Because the installation of the guide 264 with the probe 274 is essentially a blind operation, the tabs 310 of the guide 264 could easily be pushed past the annular groove 222. If that happens the guide 264 could be damaged.

Advantageously, the disk 300 of the poppet 262 combined with the protrusion 280 of the base tool 270 function as a mechanical stop for the guide 264. The mechanical stop provided by the disk 300 and the protrusion 280 enables the tabs 310 of the guide 264 to be accurately aligned with the annular groove 222 in order to secure the guide 264 in the tank tee passageway 218.

In the embodiment shown in FIG. 21, the spring 266 is a conical spring having concentric conical coils. The spring may be composed of stainless steel or other type of water-resistant spring wire. When the spring 266 is fully compressed, the coils align substantially in a single plane and concentrically within each other from the largest diameter coil to the smallest diameter coil. As such, the solid height of the fully compressed conical spring 266 is advantageously the diameter of the spring wire that the conical spring is formed from.

Moreover, the guide base 306 of guide 264 includes an upstream side 318 (see FIGS. 12A and 12B) having an outer circumferential portion 320 and an inner cavity portion 322. The inner cavity portion 322 is sized to receive the largest coil of the conical spring 266. Accordingly, when the guide 264 is inserted through the sleeve tool 272 until it reaches the mechanical stop provided by the poppet 262 and protrusion 280 of the base tool 270, the upstream side 318 of the guide base 306 abuts against the poppet disk 300. More specifically, the outer circumferential portion 320 of the upstream side 318 of the guide base 306 abuts flush against the top surface of the disk 300 of the poppet 262 and the conical spring 266 is fully compressed into the inner cavity portion 322 of the guide 264. By having the guide 264 abut against the disk 306 of the poppet 262, rather than against the spring 266, a very stable and precise mechanical stop may be provided because the outer diameter of the guide base 306 may be sized to be near or substantially equal to the outer diameter of the disk 300, and the outer diameter of the guide base 306 will be larger than the largest outer diameter of the coils of the spring 266.

Moreover, the compact coiling of the conical spring 266 to the thickness of its diameter allows the poppet 262 to seat and be supported by the outer circumferential portion 320 of the upstream side 318 of the guide 264, when the poppet 262 is in its fully open position. This reduces noise and chatter normally associated with high flow conditions. Additionally, because the disk 300 of poppet 262 is flush against the upstream surface 320 cavitation and pressure fluctuations between the disk 300 and guide base 306 are greatly reduced. This, in turn, reduces oscillations of the poppet 262 during operation, which further reduces wear on the poppet valve assembly 260.

Figure 22:
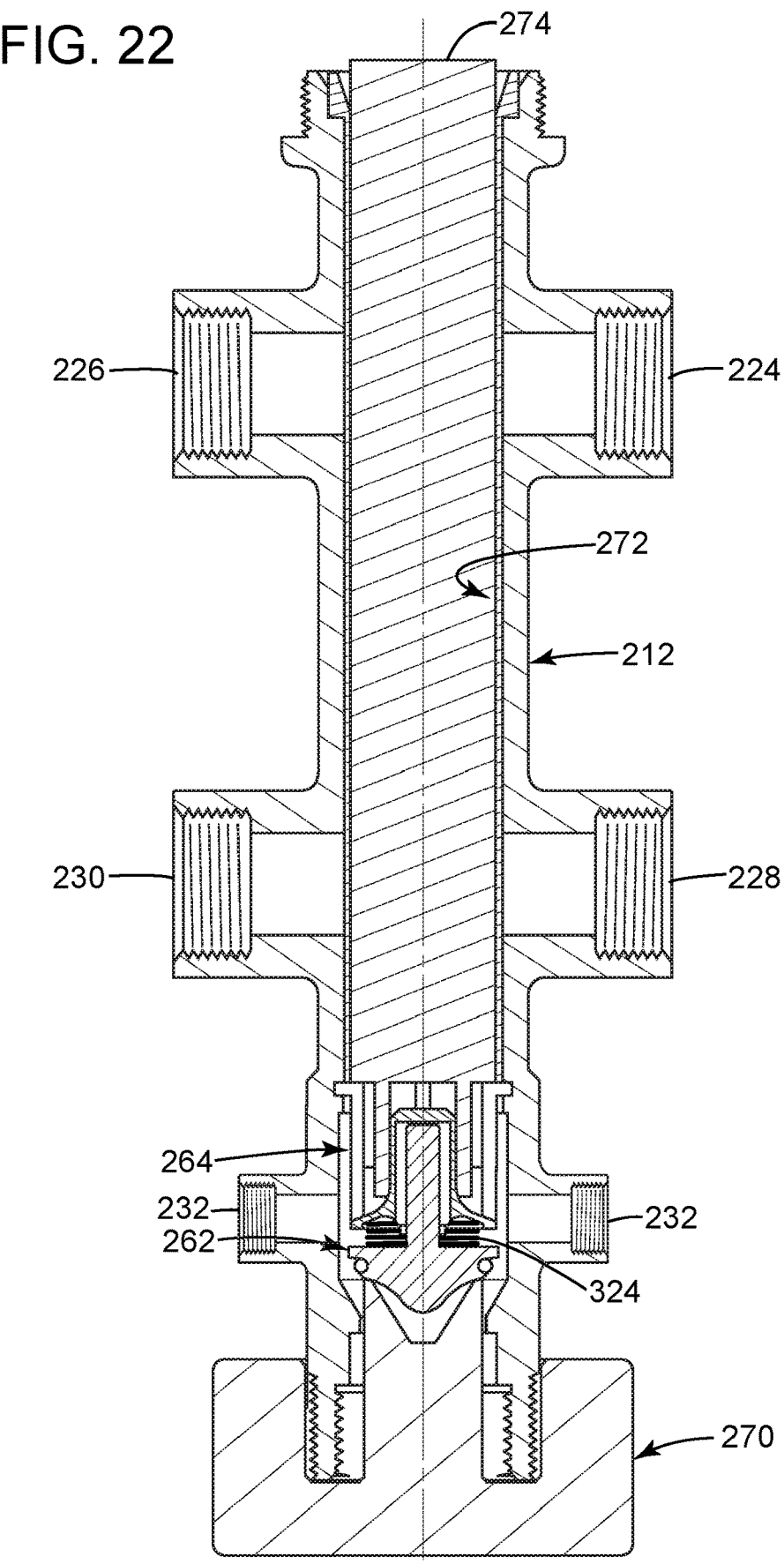
FIG. 22 depicts a cross sectional view of an exemplary alternative embodiment, in accordance with the present invention, wherein a straight spring is utilized in combination with the poppet and base tool protrusion to provide a mechanical stop for the guide.

Referring to FIG. 22, a cross sectional view of an exemplary alternative embodiment is depicted in accordance with the present invention, wherein a straight spring 324 is utilized in combination with the poppet 262 and base tool protrusion 280 to provide a mechanical stop for the guide 264. In this case, the solid height of the spring 324 must be taken into account. In this case, the base 306 abuts against the spring 324 rather than the poppet disk 300.

Figure 23:
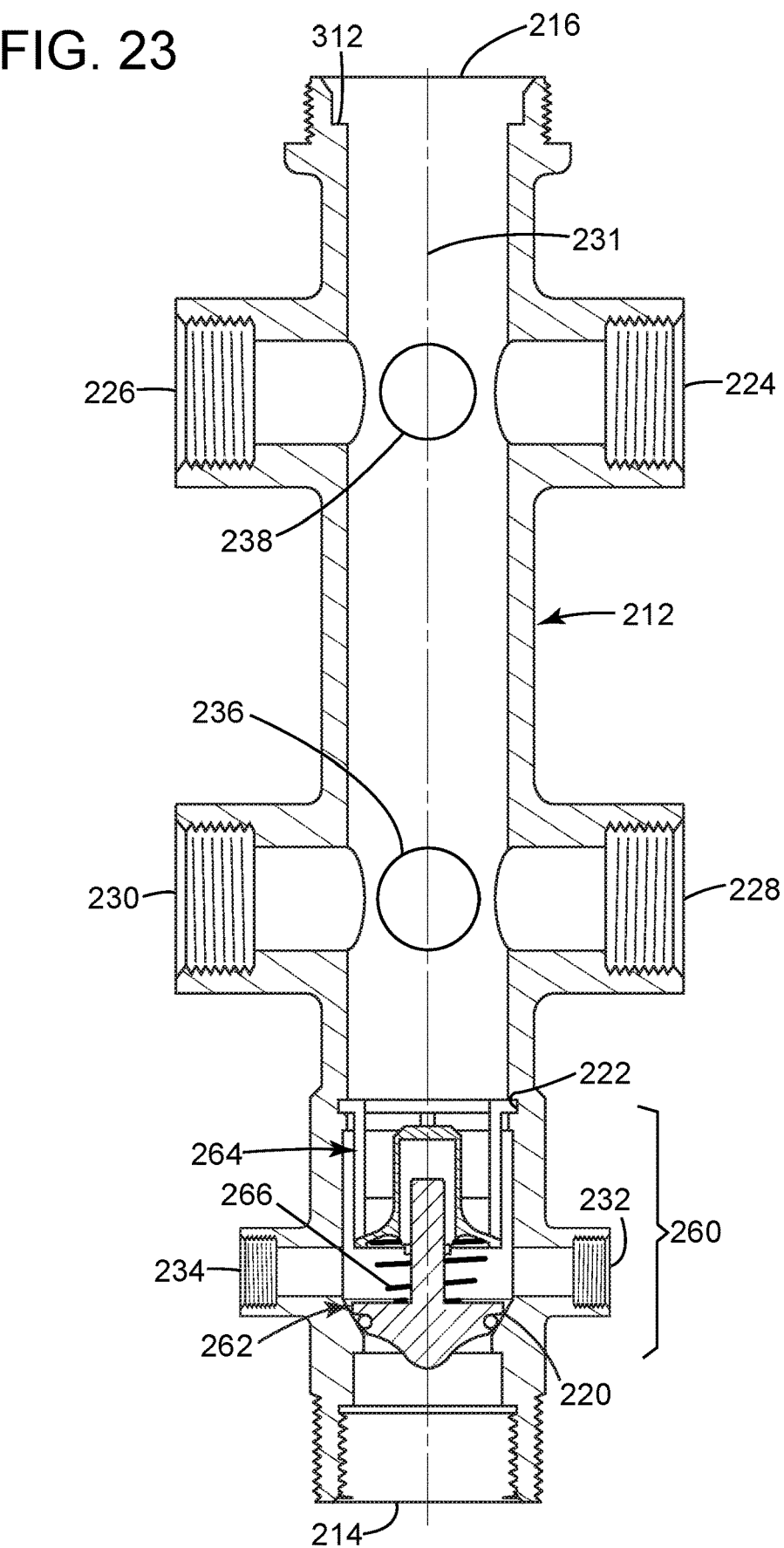
FIG. 23 depicts a cross sectional view of an exemplary embodiment of the next stage of the method, in accordance with the present invention, wherein the poppet valve assembly is fully assembled in the tank tee body between the annular flange and the annular groove.

Referring to FIG. 23, a cross sectional view of an exemplary embodiment of the next stage of the method is depicted in accordance with the present invention, wherein the poppet valve assembly 260 is fully assembled in the tank tee body 212 between the annular flange 220 and the annular groove 222. At this stage of the method, the base tool 270, sleeve tool 272 and probe tool 274 have been removed and the poppet 262 has been urged by the expanded spring 266 from its fully open position where it abuts the guide 264 to its fully closed position where it abuts the annular flange 220.

Referring to FIG. 24, a flow diagram of an exemplary embodiment of the method of assembling a poppet valve assembly 260 into a tank tee assembly 210 is depicted in accordance with the present invention. The method follows the method described and illustrated in FIGS. 14-22.

At 330, a tank tee assembly 210 having a tank tee body is provided. The tank tee body 212 includes a tank tee inlet 214, a tank tee outlet 216 and a tank tee passageway 218 therebetween. An inner annular shoulder 312 is disposed on a peripheral surface of the tank tee passageway 218 proximate the tank tee outlet 216. An annular flange 220 is disposed on the peripheral surface of the tank tee passageway 218 proximate the tank tee inlet 214. An annular groove 222 is disposed in the peripheral surface of the tank tee passageway 218 downstream of the annular flange 220. At least one through-hole structure 224, 226, 228, 230, 236, 238 is disposed in the tank tee body 212 downstream of the annular groove 222.

At 332, components of a poppet valve assembly 260 are provided. The components include a poppet 262 and a guide 264. The poppet 262 has a disk 300 and a stem 302 extending from the disk 300. The guide 264 has a rigid guide base 306, support arms 308 extending upwards from the guide base 306 and arcuate tabs 310 disposed on distal ends of the support arms 308.

At 334, the tank tee inlet 214 is mounted onto a base tool 270. The base tool 270 is configured such that a central protrusion 280 of the base tool 270 extends past the annular flange 220 when the tank tee inlet is mounted thereon.

At 336, the poppet 262 is inserted through the tank tee outlet 216, such that a bottom surface 304 of the disk 300 of the poppet 262 is abutted against a top surface 282 of the protrusion 280. The poppet 262 and the protrusion advantageously provide a mechanical stop for the guide 264 in order to accurately position the guide 264 in the tank tee passageway 218.

At 338, a sleeve tool 272 is inserted through the tank tee outlet 216. The sleeve tool 272 has an upper rim 288 configured to mount against the inner annular shoulder 312. When the sleeve tool 272 is mounted against the inner annular shoulder 312, the sleeve tool 272 extends past the at least one through-hole structure 224, 226, 228, 230, 236, 238 and a distal end 286 of the sleeve tool 272 is positioned proximate, and just downstream of, the annular groove 222.

At 340, the guide 264, utilizing a probe tool 274, is inserted through the sleeve tool 272 until the guide base 306 of the guide 264 is supported by the poppet 262 and protrusion 280. The poppet 262 and protrusion 280 positioning the guide 264 so that the tabs 310 of the guide 264 fit into the annular groove 222 to rigidly secure the guide 264 within the tank tee passageway 218. In other words, the tabs 310 snap in place in the annular groove 222 to lock the guide 264 in place and center the guide 264 about the centerline 213, as the tabs 310 are no longer compressed by the sleeve tool 272 at this location.

Referring to FIG. 25, a flow diagram of an exemplary embodiment of the method of assembling a poppet valve assembly 260 into a tank tee assembly 210 is further depicted in accordance with the present invention. The flow diagram of FIG. 25 supplements the flow diagram of FIG. 24.

At 342, a spring 266 is inserted through the tank tee outlet 216 after inserting the poppet 262 and prior to inserting the sleeve tool 272. The spring 266, in this embodiment, is a conical spring having concentric conical coils designed to nest within each larger coil diameter to minimize the vertical height when compressed, which makes the poppet valve assembly 260 more compact and flow efficient.

At 344, the guide base 306 of the guide 264 includes an upstream side 318 having an outer circumferential portion 320 and an inner cavity portion 322. The inner cavity portion 322 is sized to receive the largest coil of the conical spring 266.

At 346, the guide 264 is inserted, via the probe 274, through the sleeve tool 272 until the circumferential portion 320 of the guide 264 abuts flush against the disk 300 of the poppet 262 and the conical spring 266 is fully compressed into the cavity portion 322 of the guide 264. More specifically, the outer circumferential portion 320 of the upstream side 318 of the guide base 306 abuts flush against the top surface of the disk 300 of the poppet 262 and the conical spring 266 is fully compressed into the inner cavity portion 322 of the guide 264. By having the guide 264 abut against the disk 306 of the poppet 262, rather than against the spring 266, a very stable and precise mechanical stop may be provided because the outer diameter of the guide base 306 may be sized to be near or substantially equal to the outer diameter of the disk 300, and the outer diameter of the guide base 306 will be larger than the largest outer diameter of the coils of the spring 266.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A tank tee assembly comprising:
   a tank tee body including a tank tee inlet, a tank tee outlet and a tank tee passageway therebetween;
   an annular flange disposed on a peripheral surface of the tank tee passageway;
   at least one through-hole structure disposed in the tank tee body downstream of the annular flange; and
   a poppet valve assembly disposed in the tank tee passageway between the annular flange and the at least one through-hole structure, the poppet valve assembly comprising:
   a poppet comprising a disk and a stem extending from the disk, the disk being resiliently biased by a spring to engage against the annular flange when the poppet is in a closed position,
   the spring comprising concentrically conical coils disposed between the poppet and a guide, and
   the guide being rigidly secured within the tank tee passageway, the guide comprising a guide base, the guide base comprising an outside diameter that is larger than an inside diameter of the annular flange, the guide base including an upstream side comprising an outer circumferential portion and an inner cavity portion, the inner cavity portion sized to receive a largest coil of the conical coils of the spring;
   wherein, when the poppet is in a fully open position, the spring is fully compressed into the cavity portion and the disk of the poppet is flush against the circumferential portion of the upstream side of the guide base; and
   wherein the tank tee passageway is free of any threaded connections between the poppet valve assembly and the at least one through-hole structure.

2. The tank tee assembly of claim 1, comprising:
an annular groove disposed in the peripheral surface of the tank tee passageway downstream of the annular flange; and
the guide further comprising support arms extending upwards from a peripheral portion of a downstream side of the guide base, the support arms comprising arcuate tabs disposed on distal ends of the support arms, the tabs sized to fit within the annular groove to rigidly secure the guide within the tank tee passageway.

3. The tank tee assembly of claim 1 wherein the guide base has an outside diameter that is at least 75 percent of the inside diameter of the tank tee passageway.

4. The tank tee assembly of claim 1, wherein the disk of the poppet valve has an outside diameter that is greater than an inside diameter of the annular flange and is at least 75 percent of an inside diameter of the tank tee assembly.

5. The tank tee assembly of claim 1, wherein the disk has an outside diameter that is substantially equal to the outside diameter of the guide base.

6. The tank tee assembly of claim 1, wherein the at least one through-hole structure comprises a plurality of pairs of through-hole structures disposed on opposing sides of the tank tee body.

7. The tank tee assembly of claim 1, wherein:
the distance between the poppet valve assembly and the at least one through-hole structure is less than 4 inches; and
the tank tee passageway is free of any threaded connections between the poppet valve assembly and the at least one through-hole structure.

8. The tank tee assembly of claim 1, wherein the poppet valve assembly has an allowable operating pressure of at least 50 pounds per square inch.

9. The tank tee assembly of claim 1, wherein the annular flange includes a poppet valve seat on a downstream side of the annular flange, the poppet valve seat sealingly engaging with the poppet disk when the poppet is in its closed position.

10. The tank tee assembly of claim 1, comprising:
a ball valve assembly including:
 a valve body including a valve inlet, a valve outlet and a valve passageway therebetween,
 a ball element disposed within the valve passageway,
 a ball valve seat disposed within the valve passageway between the tank tee outlet of the tank tee body and the ball element of the ball valve assembly;
wherein the valve inlet is in threaded engagement with the tank tee outlet such that the tank tee body urges the ball valve seat into sealing engagement against the ball element.

11. A method of assembling a poppet valve assembly into a tank tee assembly, the method comprising:
providing a tank tee assembly, the tank tee assembly comprising:
 a tank tee body including a tank tee inlet, a tank tee outlet and a tank tee passageway therebetween,
 an inner annular shoulder disposed on a peripheral surface of the tank tee passageway proximate the tank tee outlet;
 an annular flange disposed on the peripheral surface of the tank tee passageway proximate the tank tee inlet,
 an annular groove disposed in the peripheral surface of the tank tee passageway downstream of the annular flange, and
 at least one through-hole structure disposed in the tank tee body downstream of the annular groove;
providing components of a poppet valve assembly, the components comprising a poppet and a guide:
 the poppet comprising a disk and a stem extending from the disk, and
 the guide comprising a guide base, support arms extending upwards from the guide base and arcuate tabs disposed on distal ends of the support arms;
mounting the tank tee inlet onto a base tool, such that a central protrusion of the base tool extends past the annular flange;
inserting the poppet through the tank tee outlet, such that a bottom surface of the disk of the poppet is abutted against a top surface of the protrusion;
inserting a sleeve tool through the tank tee outlet, the sleeve tool comprising an upper rim configured to mount against one of the inner annular shoulder and a distal end of the tank tee outlet wherein, when the sleeve tool is mounted against the one of the inner annular shoulder and the distal end of the tank tee inlet, the sleeve tool extends past the at least one through-hole structure and a distal end of the sleeve tool is positioned proximate the annular groove;
inserting the guide, utilizing a probe tool, through the sleeve tool until the guide base of the guide is supported by the poppet and protrusion, the poppet and protrusion positioning the guide so that the tabs of the guide fit into the annular groove to rigidly secure the guide within the tank tee passageway.

12. The method of claim 11, comprising:
inserting a spring through the tank tee outlet after inserting the poppet and prior to inserting the sleeve tool.

13. The method of claim 12, comprising:
the spring comprising a conical spring comprising concentric conical coils; and
the guide base including an upstream side comprising an outer circumferential portion and an inner cavity portion, the inner cavity portion sized to receive the largest coil of the conical spring;
wherein, inserting the guide comprises: inserting the guide through the sleeve tool until the circumferential portion of the guide abuts flush against the disk of the poppet and the conical spring is fully compressed into the cavity portion of the guide.

14. The method of claim 11, wherein the sleeve tool has an outside diameter that is less than the inside diameter of the tank tee passageway and an inside diameter that is at least 90 percent of the inside diameter of the tank tee passageway.

15. The method of claim 11, wherein the sleeve tool is at least 5 inches long.

16. The method of claim 11, wherein:
the at least one through-hole structure comprises a plurality of pairs of through-hole structures disposed on opposing sides of the tank tee body; and
when the sleeve tool is mounted against the inner annular shoulder, the sleeve tool extends past the plurality of pairs of through-hole structures.

17. The method of claim 11, comprising:
utilizing an inwardly tapered inside surface of the upper rim of the sleeve tool to urge the tabs disposed on the distal ends of the support arms radially inward until the tabs fit within the inside diameter of the sleeve tool; and
snapping the tabs into the annular groove when the tabs are released from the distal end of the sleeve tool.

18. The method of claim 11, comprising:
manufacturing the sleeve tool from a three-dimensional printing process.

19. The method of claim 11, wherein the sleeve tool is comprised of a plastic.

* * * * *